(12) United States Patent
Iwata

(10) Patent No.: US 11,498,247 B2
(45) Date of Patent: Nov. 15, 2022

(54) FOAMING PARTICLE MANUFACTURING DEVICE USING POLYOLEFIN-BASED RESIN PARTICLE AND METHOD FOR MANUFACTURING SAID FOAMING PARTICLE

(71) Applicant: KANEKA CORPORATION, Osaka (JP)

(72) Inventor: Yasuhiro Iwata, Osaka (JP)

(73) Assignee: KANEKA CORPORATION, Osaka (JP)

( * ) Notice: Subject to any disclaimer, the term of this patent is extended or adjusted under 35 U.S.C. 154(b) by 909 days.

(21) Appl. No.: 16/232,820

(22) Filed: Dec. 26, 2018

(65) Prior Publication Data

US 2019/0126524 A1    May 2, 2019

Related U.S. Application Data

(63) Continuation of application No. PCT/JP2017/023381, filed on Jun. 26, 2017.

(30) Foreign Application Priority Data

Jul. 6, 2016    (JP) .............................. JP2016-134406

(51) Int. Cl.
*B29C 44/00*    (2006.01)
*B29C 44/34*    (2006.01)
(Continued)

(52) U.S. Cl.
CPC .......... *B29C 44/3461* (2013.01); *B29C 44/00* (2013.01); *B29C 44/02* (2013.01);
(Continued)

(58) Field of Classification Search
CPC ............................ B01F 15/00896; B01J 3/002
See application file for complete search history.

(56) References Cited

U.S. PATENT DOCUMENTS 2,082,796 A        6/1937   Gaertner
4,298,576 A   *   11/1981   Thyret ..................... B01J 3/002
                                                            422/135
(Continued)

FOREIGN PATENT DOCUMENTS

CN        1215417 A        4/1999
CN      102068955 A   *   5/2011
(Continued)

OTHER PUBLICATIONS

Office Action issued in corresponding Application No. 201780040382. 2; dated Apr. 21, 2020 (24 pages).
(Continued)

*Primary Examiner* — Timothy Kennedy
*Assistant Examiner* — Farah Taufiq
(74) *Attorney, Agent, or Firm* — Osha Bergman Watanabe & Burton LLP

(57) ABSTRACT

An expanded particle producing apparatus includes a vessel and a blade stirrer that is located inside the vessel. The blade stirrer comprises a stirrer base and an impeller blade that is attached to the stirrer base. A distance from the bottom of the vessel to the center of the stirrer base (L1) and a depth of the vessel (L2) have a ratio (L1/L2) of 0.01 to 0.2. L1 is measured in a depth direction parallel to L2, and a central axis of the blade stirrer coincides with a central axis of the vessel. The apparatus is configured to produce expanded particles.

9 Claims, 9 Drawing Sheets

(51) Int. Cl.
*C08J 9/16* (2006.01)
*B29C 44/02* (2006.01)
*C08J 9/20* (2006.01)
*C08J 9/236* (2006.01)

(52) U.S. Cl.
CPC . *C08J 9/16* (2013.01); *C08J 9/20* (2013.01); *C08J 9/236* (2013.01); *C08J 2203/22* (2013.01); *C08J 2323/12* (2013.01)

(56) References Cited

U.S. PATENT DOCUMENTS

| | | | |
|---|---|---|---|
| 4,716,021 | A | 12/1987 | Akiyama et al. |
| 5,380,766 | A | 1/1995 | Trager et al. |
| 5,830,922 | A | 11/1998 | Wirobski et al. |
| 6,130,266 | A * | 10/2000 | Mihayashi ............... C08J 9/18 521/134 |
| 6,596,782 | B1 | 7/2003 | Mogami et al. |
| 2006/0163260 | A1 * | 7/2006 | Schmidt ............... B01F 27/90 220/565 |
| 2006/0217452 | A1 * | 9/2006 | Inada ............... C08J 9/18 521/142 |
| 2008/0214751 | A1 | 9/2008 | Galewski |
| 2016/0317983 | A1 * | 11/2016 | Jones ............... B28C 5/381 |

FOREIGN PATENT DOCUMENTS

| | | |
|---|---|---|
| CN | 102068955 A | 5/2011 |
| CN | 103223312 A | 7/2013 |
| CN | 203355723 U | 12/2013 |
| CN | 203513678 U | 4/2014 |
| CN | 103894137 A | 7/2014 |
| CN | 104128133 A | 11/2014 |
| CN | 105195046 A | 12/2015 |
| JP | S58-164724 U | 11/1983 |
| JP | S59-35926 A | 2/1984 |
| JP | S59-172532 A | 9/1984 |
| JP | S62-18214 A | 1/1987 |
| JP | H01-301210 A | 12/1989 |
| JP | H07-11042 A | 1/1995 |
| JP | H07-188447 A | 7/1995 |
| JP | H10-237212 A | 9/1998 |
| JP | 2011-213900 A | 10/2011 |
| JP | 2012-200885 A | 10/2012 |
| WO | 2005085337 A1 | 9/2005 |

OTHER PUBLICATIONS

Extended European Search Report issued in corresponding European U.S. Appl. No. 17/824,051.1, dated Jan. 31, 2020 (10 pages).
Reaction Device of Industrial Polymerization, Wang Kai et al., Sinopec Press, Apr. 30, 1997, pp. 150-151.
Design of Mixing Equipment, Wang Kai et al., Mechanical Industry Press, Jul. 31, 2000, p. 235.
Office Action issued in counterpart Chinese Patent Application No. CN 201780040382.2 dated Aug. 16, 2021 (24 pages).
International Search Report issued in International Application No. PCT/JP2017/023381, dated Aug. 29, 2017 (2 pages).
International Preliminary Report on Patentability issued in International Application No. PCT/JP2017/023381, dated Jan. 17, 2019 (7 pages).

* cited by examiner

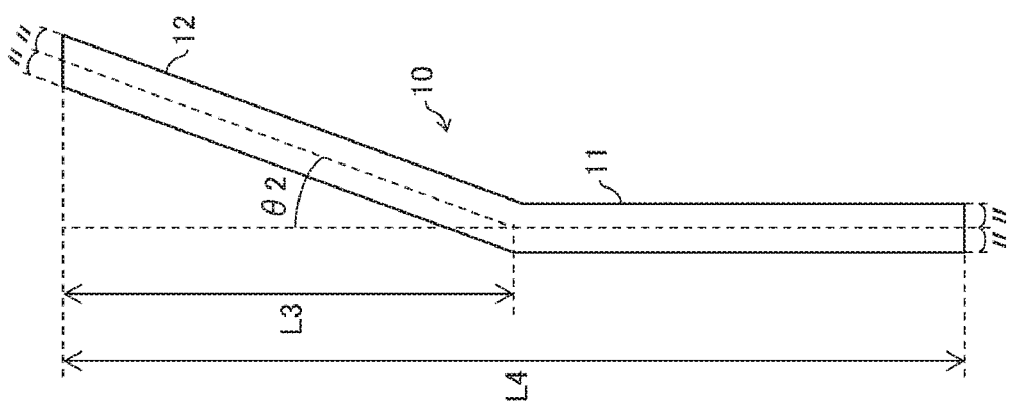
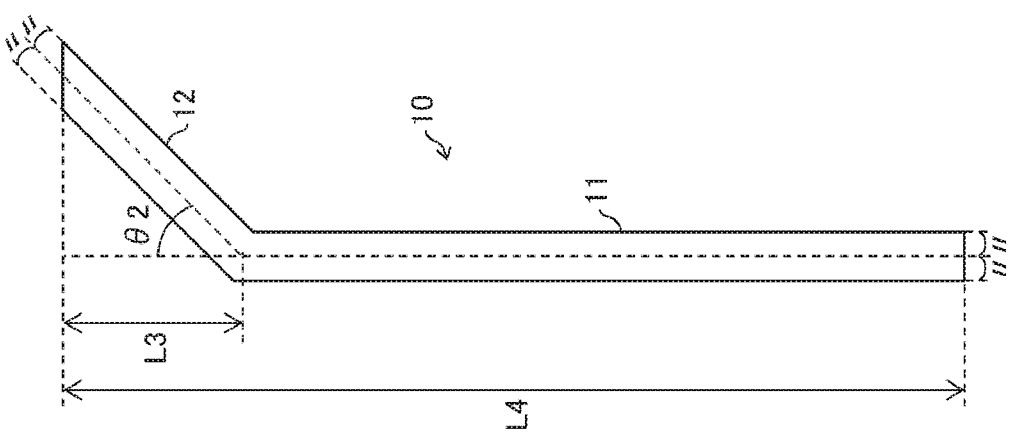

FOAMING PARTICLE MANUFACTURING DEVICE USING POLYOLEFIN-BASED RESIN PARTICLE AND METHOD FOR MANUFACTURING SAID FOAMING PARTICLE

TECHNICAL FIELD

One or more embodiments of the present invention relate to an expanded particle producing apparatus for producing expanded particles by: dispersing polyolefin resin particles in a vessel with water and a dispersing agent; maintaining the internal temperature and the internal pressure of the vessel at a certain temperature and a certain pressure; and thereafter releasing the polyolefin resin particles to an atmosphere having a pressure lower than the internal pressure of the vessel, and relate to a method of producing the expanded particles.

BACKGROUND

The following expanded particle production method is known: a method of producing expanded particles by dispersing polyolefin resin particles in a vessel with water and a dispersing agent, maintaining the internal temperature and the internal pressure of the vessel at a certain temperature and a certain pressure, and thereafter releasing the polyolefin resin particles to an atmosphere having a pressure lower than the internal pressure of the vessel. A method further involving dispersing an expanding agent in the vessel depending on need is also known.

The above methods involve dispersing polyolefin resin particles at high temperature and high pressure, and therefore the resin particles are likely to fuse each other. To address this, a stirring operation is carried out to prevent the fusion.

In order to prevent the fusion and to maintain the particles to be well dispersed, Patent Literature 1 discloses a method of carrying out stirring with the use of a special H-type blade stirrer inclined in the direction of stirring.

However, in one or more embodiments where the stirring is carried out with the use of the special H-type blade stirrer, the degree of vertical mixing in the vessel is low and many bubbles form.

Meanwhile, it takes some time for the polyolefin resin particles to be released into an atmosphere having a pressure lower than the internal pressure of the vessel. This also leads to a result that the degree of vertical mixing in the vessel is low and many bubbles form. In one or more embodiments where the foregoing special H-type blade stirrer is used, the amount of release of the polyolefin resin particles changes with time and therefore the expanded particles resulting from the release are non-uniform in quality. Furthermore, since many bubbles form, the total volume to be released is large and therefore it takes more time for the particles to be released, which results in an increase in production cycle time (time required for production), and in turn in a reduction in productivity. In addition, the special H-type blade stirrer has a large surface area and therefore requires large power to carry out stirring, resulting in an increase in cost of electricity.

For preventing the fusion between resin particles, Patent Literature 2 discloses a method of carrying out stirring with the use of a turbine stirrer provided at the inclined bottom of a vessel. However, Patent Literature 2 does not mention any issue that may arise because of a special H-type blade stirrer.

CITATION LIST

Patent Literature 1

Japanese Patent Application Publication, Tokukaisho, No. 59-172532

Patent Literature 2

Japanese Patent Application Publication, Tokukaisho, No. 62-18214

SUMMARY

One or more embodiments of the present invention provide (i) an expanded particle producing apparatus that is capable of reducing the amount of bubble formation by maintaining resin particles to be well dispersed so that the resin particles are prevented from fusing with each other in a vessel and by achieving good vertical mixing in the vessel and that is thereby capable of obtaining homogeneous expanded particles and (ii) a method of producing the expanded particles.

The inventor of the present invention found that a blade stirrer provided at a specific distance from the bottom of a vessel achieves good vertical mixing in the vessel, thereby the amount of bubble formation is reduced, and therefore homogeneous expanded particles are obtained. On the basis of this finding, the inventor accomplished one or more embodiments of the present invention.

Specifically, one or more embodiments of the present invention have the following configuration.

An expanded particle producing apparatus configured to produce expanded particles by: dispersing polyolefin resin particles in a vessel with water and a dispersing agent; maintaining an internal temperature and an internal pressure of the vessel at a certain temperature and a certain pressure; and thereafter releasing the polyolefin resin particles to an atmosphere having a pressure lower than the internal pressure of the vessel, the expanded particle producing apparatus including a blade stirrer including a stirrer base and an impeller blade that is attached to the stirrer base, the blade stirrer being positioned such that a ratio L1/L2 of a distance L1 to a depth L2 is not less than 0.01 and not more than 0.2 and that a central axis of the blade stirrer coincides with a central axis of the vessel, the distance L1 being a distance from a bottom of the vessel to a center of the stirrer base in a direction of a depth of the vessel, the depth L2 being the depth of the vessel.

An expanded particle producing apparatus according to one or more embodiments of the present invention achieves good vertical mixing in a vessel, thereby reducing the amount of bubble formation. This makes it possible to obtain homogeneous expanded particles. This also makes it possible to reduce production cycle time (time required for production) and power required for stirring.

BRIEF DESCRIPTION OF DRAWINGS

FIG. 6A is an elevational view illustrating a blade stirrer constituted by a single impeller blade. FIG. 6B is an elevational view illustrating a blade stirrer constituted by impeller blades each of which has an angle of inclination and includes bent portions. FIG. 6C is an elevational view illustrating a blade stirrer constituted by impeller blades each including an extended portion so as to match the shape of the bottom of the vessel, as illustrated in FIG. 5. FIG. 6D is an elevational view illustrating a blade stirrer constituted by impeller blades in the form of a propeller. FIG. 6E is a perspective view illustrating the blade stirrer of FIG. 6D viewed from a different angle (from a different point of view).

FIGS. 8A-8C show elevational views schematically illustrating examples of a baffle provided to an expanded particle producing apparatus according to one or more embodiments of the present invention. FIGS. 8A and 8B are elevational views illustrating baffles each including an inclined portion at the upper portion thereof. FIG. 8C is an elevational view illustrating a baffle which itself is inclined.

DETAILED DESCRIPTION OF THE EMBODIMENTS

The following description will discuss one or more embodiments of the present invention. Note, however, that the present invention is not limited to the following embodiments, but can be altered by a skilled person in the art within the scope of the claims. The present invention also encompasses, in its technical scope, any embodiment or example derived by combining technical means disclosed in differing embodiments and/or examples. All academic and patent literatures listed herein are incorporated herein by reference. Note that the expression "A to B", representing a numeric range, herein means "not less than A and not more than B" (i.e., "between A and B, inclusive"), unless otherwise specified in this specification.

An expanded particle producing apparatus according to one or more embodiments of the present invention is an expanded particle producing apparatus configured to produce expanded particles by: dispersing polyolefin resin particles in a vessel with water and a dispersing agent; maintaining the internal temperature and the internal pressure of the vessel at a certain temperature and a certain pressure; and thereafter releasing the polyolefin resin particles to an atmosphere having a pressure lower than the internal pressure of the vessel. The expanded particle producing apparatus includes stirring equipment to prevent fusion between the polyolefin resin particles which are dispersed at high temperature and high pressure.

According to the expanded particle producing apparatus according to one or more embodiments of the present invention, a state in which an aqueous dispersion slurry in the vessel consistently flows from top to bottom, that is, good vertical mixing in the vessel, is achieved, and thereby the amount of bubble formation can be reduced. This makes it possible to obtain homogeneous expanded particles. This also makes it possible to reduce production cycle time (time required for production) and power required for stirring. In this specification, the degree to which the constituents of an aqueous dispersion slurry in a vessel are mixed by consistent flow from top to bottom may be referred to as "the degree of vertical mixing". The expression "good vertical mixing" has the same meaning as "a high degree of vertical mixing".

The following description will discuss an expanded particle producing apparatus according to one or more embodiments of the present invention in detail with reference to FIGS. 1 to 11.

<1. Expanded Particle Producing Apparatus>

[1-1. Vessel 1]

Figure 1:
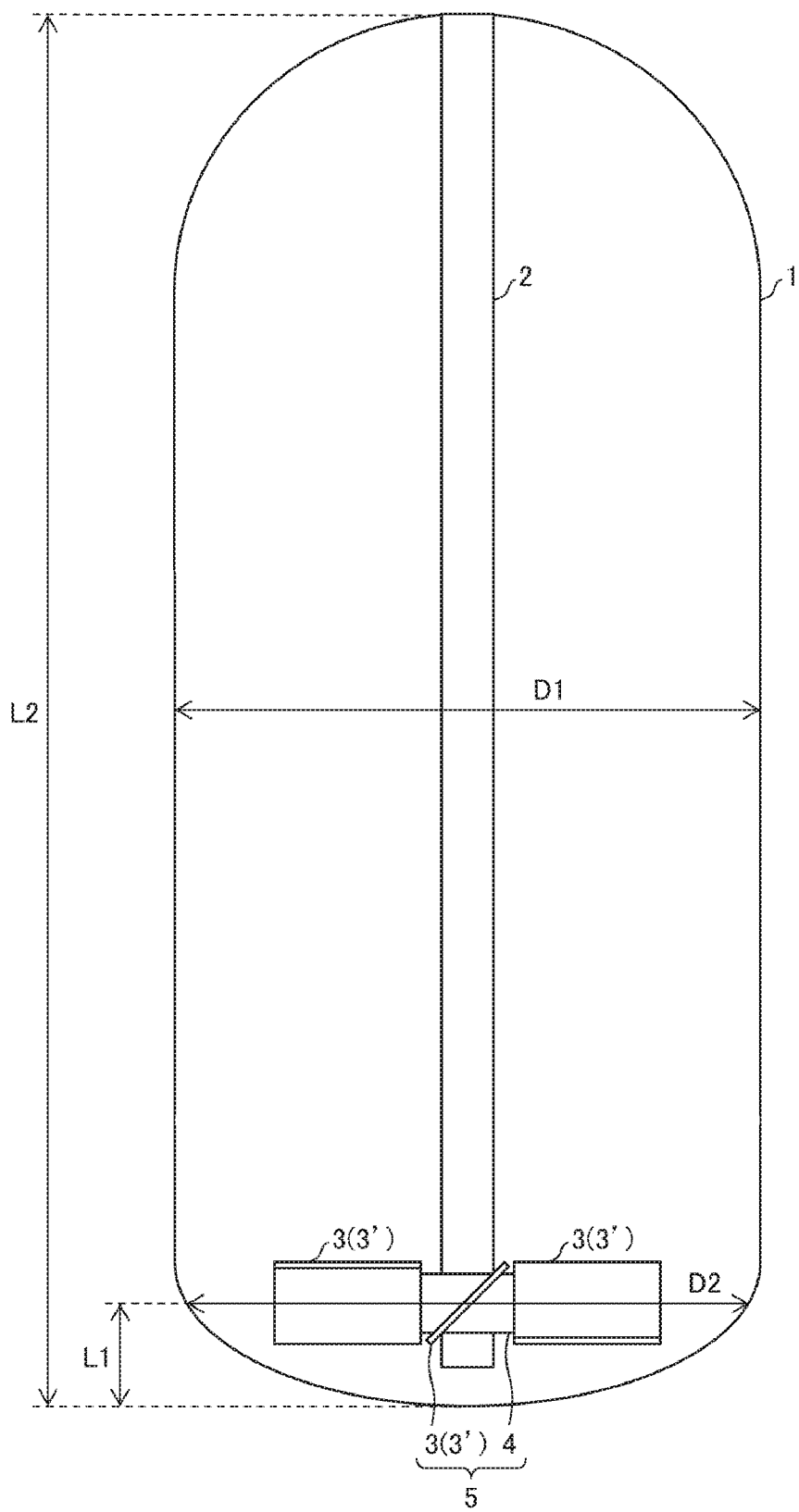
FIG. 1 is an elevational view schematically illustrating an expanded particle producing apparatus according to one or more embodiments of the present invention, and illustrates where in a vessel a blade stirrer is provided.

FIG. 1 is an elevational view schematically illustrating an expanded particle producing apparatus according to one or more embodiments of the present invention, and illustrates where in a vessel 1 a blade stirrer 5 is provided. In one or more embodiments of the present invention, a method of installing the vessel 1 which constitutes the expanded particle producing apparatus is not particularly limited. In this specification, parameters of constituent members of the expanded particle producing apparatus are defined on the assumption that the central axis of the vessel 1 is parallel to the direction of gravitational force, e.g., vertical direction.

In this specification, the term "bottom of vessel 1" refers to "bottom of inner wall of vessel 1".

In this specification, the length of the central axis of the vessel 1 extending in the vertical direction from one point on the inner wall to another point on the inner wall of the vessel 1 is defined as "depth L2 of vessel 1", and may be referred to as "depth L2" for short.

In one or more embodiments of the present invention, the depth L2 of the vessel 1 is not particularly limited; however, in order to achieve good vertical mixing in the vessel 1 and to reduce the power required for stirring, the depth L2 of the vessel 1 is preferably 1000 mm to 6000 mm, more preferably 1000 mm to 5000 mm, even more preferably 1000 mm to 4000 mm, particularly preferably 1000 mm to 3000 mm.

In this specification, the term "inner diameter D1 of cylindrical portion of vessel 1" is defined as follows: assuming that a line is drawn perpendicular to the central axis of the vessel 1 such that each of the opposite ends of the line intersects the inner wall of the vessel 1 and that the line segment defined by the two intersections on the inner wall becomes longest, the length of this line segment is used as "inner diameter D1 of cylindrical portion of vessel 1". This "inner diameter D1 of cylindrical portion of vessel 1" may be referred to as "cylindrical portion's inner diameter D1" for short.

In one or more embodiments of the present invention, the cylindrical portion's inner diameter D1 of the vessel 1 is not particularly limited; however, in order to achieve good vertical mixing in the vessel 1 and to reduce the power required for stirring, the cylindrical portion's inner diameter D1 of the vessel 1 is preferably 400 mm to 3000 mm, more preferably 400 mm to 2500 mm, even more preferably 400 mm to 2000 mm, particularly preferably 400 mm to 1500 mm.

In one or more embodiments of the present invention, the ratio of the depth L2 of the vessel 1 to the cylindrical portion's inner diameter D1 of the vessel 1 (such a ratio is represented as L2/D1) is not particularly limited; however, in order to achieve good vertical mixing in the vessel 1 and to reduce the power required for stirring, the ratio L2/D1 is preferably 1.0 to 3.0, more preferably 1.0 to 2.8, even more preferably 1.0 to 2.5, particularly preferably 1.0 to 2.2.

In this specification, an inner diameter in the horizontal direction of the vessel 1, at a position where a point on the blade stirrer 5 used to define "length d of impeller blade 3" (described later) is present, may be referred to as "inner diameter D2 of vessel 1 at a position where impeller blade 3 is provided". This "inner diameter D2 of vessel 1 at a position where impeller blade 3 is provided" may be referred to as "inner diameter D2 of vessel 1" or "inner diameter D2" for short. In one or more embodiments where a series of points on the blade stirrer 5 used to define "length d of impeller blade 3" form a line or just a plurality of such points are present, and where such points on the blade stirrer 5 are present on the same horizontal plane as the center of a stirrer base 4 in the vertical direction (described later) (such a center may be hereinafter referred to as "center of stirrer base 4" for short), the "inner diameter D2 of vessel 1 at a position where impeller blade 3 is provided" is the inner diameter of the vessel 1 at a position where the center of the stirrer base 4 is present. The inner diameter D2 of the vessel 1 in FIG. 1 is the inner diameter at a position where the center of the stirrer base 4 of the blade stirrer 5 is present.

In this specification, the "amount of liquid (water) that can be stored in vessel 1" may be referred to as "capacity M (in liter) of vessel 1", and may also be referred to as "capacity M" for short.

In one or more embodiments of the present invention, the capacity M (in liter) of the vessel 1 is not particularly limited; however, in order to achieve good vertical mixing in the vessel 1 and to reduce the power required for stirring, the capacity M is preferably 20 liters to 30000 liters, more preferably 100 liters to 10000 liters, even more preferably 100 liters to 5000 liters, particularly preferably 100 liters to 3000 liters.

In one or more embodiments of the present invention, the material for the vessel 1 is not particularly limited. Examples of the material for the vessel 1 include rolled steel materials for general structure (may be referred to as SS materials), stainless steel materials (may be referred to as SUS materials), other metal materials, plastic materials, and glass materials. Among these, SS materials and SUS materials are preferred for their heat resistance and pressure resistance. SUS materials are more preferred for their rust-proof properties.

In one or more embodiments of the present invention, the shape of the vessel 1 is not particularly limited. Examples of the shape of the vessel 1 include cylindrical, conical, and spherical shapes, and a combination of any of these shapes. Among these, a cylindrical shape is preferred for better pressure resistance. A spherical shape or conical shape is preferred for easier particle discharge. The shape of the vessel 1 may be such that a portion of the vessel 1 is different in shape from the other portions. An example is such that the upper portion of the vessel 1 is in a cylindrical form and the lower portion of the vessel 1 is in a spherical form. For better pressure resistance and easier particle discharge, the vessel 1 more preferably has a spherical shape (hemispherical shape) at the top thereof, a cylindrical shape in the middle thereof, and a spherical shape (hemispherical shape) at the bottom thereof, as illustrated in FIG. 1.

In one or more embodiments of the present invention, the vessel 1, which constitutes the expanded particle producing apparatus, is preferably a heat- and/or pressure-resistant vessel, and is more preferably a heat-and-pressure-resistant vessel. This is because, when the vessel 1 is used to produce expanded particles, a high internal pressure is applied to the vessel 1 due to an expanding agent and then polyolefin resin particles are released from such a vessel 1 to an atmosphere having a pressure lower than the internal pressure of the vessel 1. In embodiments where the vessel 1 is a pressure-resistant vessel, the pressure-resistant vessel is preferably resistant to pressures up to 1.0 MPa to 10.0 MPa, more preferably 1.0 MPa to 8.0 MPa, even more preferably 1.0 MPa to 6.0 MPa, particularly preferably 1.0 MPa to 4.0 MPa.

In one or more embodiments of the present invention, the vessel 1, which constitutes the expanded particle producing apparatus, is preferably a heat-resistant vessel. This is because, when the vessel 1 is used to produce expanded particles, polyolefin resin particles are first allowed to soften by maintaining the polyolefin resin particles at high temperature. In embodiments where the vessel 1 is a heat-resistant vessel, the heat-resistant vessel is preferably resistant to temperatures up to 160° C., more preferably 170° C., even more preferably 180° C., particularly preferably 200° C.

[1-2. Stirrer Blade 5]

In this specification, the term "blade stirrer 5" refers to a unit that includes: one or more impeller blades 3 attached to a stirrer shaft 2; and a stirrer base 4 for connection between the impeller blade(s) 3 and the stirrer shaft 2. The impeller blade(s) 3 of the blade stirrer 5 may be attached to some member which is attached to the stirrer shaft 2, or may be attached directly to the stirrer shaft 2. In this specification, in embodiments where the impeller blade(s) 3 is/are attached to the stirrer shaft 2 with some member between them, such a member is referred to as "stirrer base 4". In embodiments where the impeller blade(s) 3 is/are attached directly to the stirrer shaft 2, the part of the stirrer shaft 2 to which the impeller blade(s) 3 is/are attached is regarded as "stirrer base 4". The term "part of the stirrer shaft 2" refers to, when the stirrer shaft 2 is viewed in a direction perpendicular to the central axis of the stirrer shaft 2 (i.e., in the horizontal direction), a region of the stirrer shaft 2 extending from the upper border of an impeller blade 3 to the lower border of the impeller blade 3. As described earlier, in embodiments where the impeller blade(s) 3 is/are attached to the stirrer shaft 2, the "part of the stirrer shaft 2" serves both as a part of the stirrer shaft 2 and as the stirrer base 4.

Figure 2:
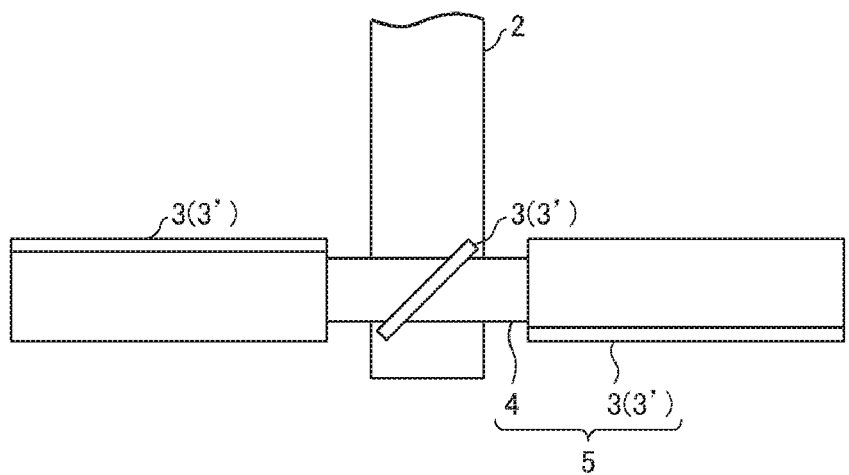
FIG. 2 is an elevational view schematically illustrating one example of a blade stirrer for use in an expanded particle producing apparatus according to one or more embodiments of the present invention.
Figure 3:
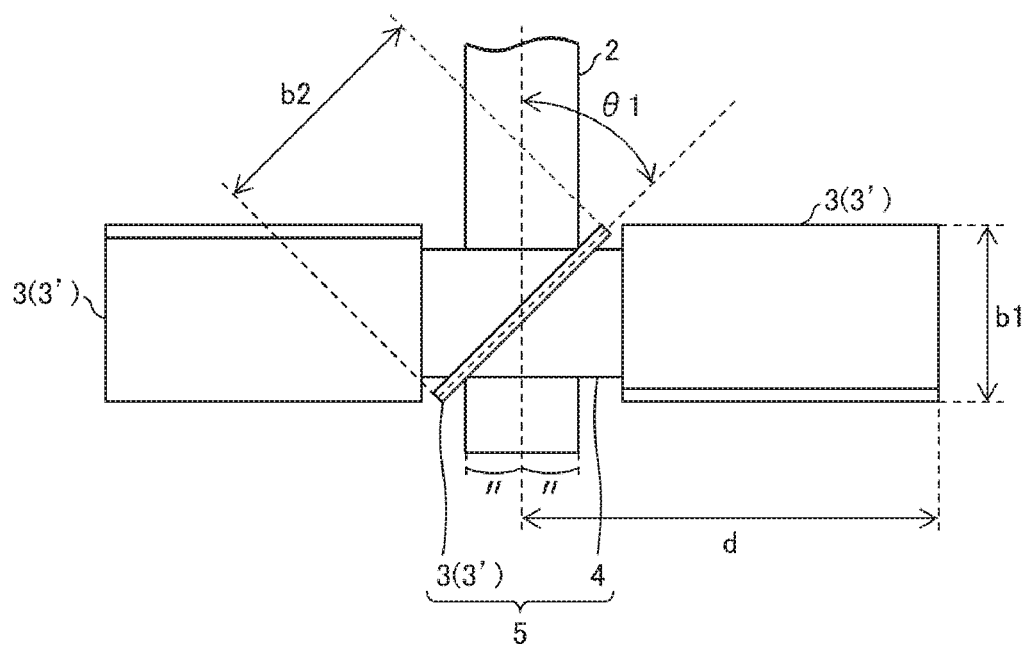
FIG. 3 is an elevational view schematically illustrating another example of a blade stirrer for use in an expanded particle producing apparatus according to one or more embodiments of the present invention.
Figure 4:
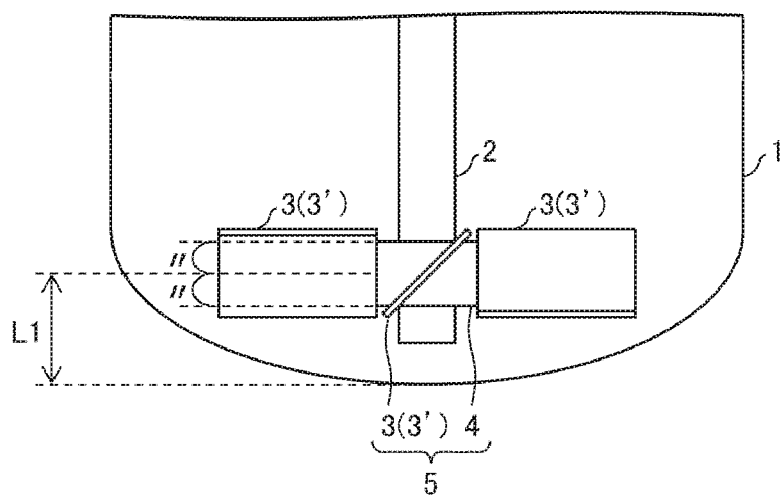
FIG. 4 is an elevational view schematically illustrating where in a vessel a blade stirrer is provided in an expanded particle producing apparatus according to one or more embodiments of the present invention.

FIG. 2 is an elevational view schematically illustrating one example of the blade stirrer 5, FIG. 3 is an elevational view schematically illustrating another example of the blade stirrer 5, and FIG. 4 is an elevational view schematically illustrating where in the vessel 1 the blade stirrer 5 is provided. The blade stirrer 5 in one or more embodiments of the present invention is not particularly limited, and can be a known and generally used blade stirrer 5. One example is a blade stirrer 5 including a plurality of impeller blades 3 each having an angle of inclination θ1, as illustrated in FIG. 3. In this specification, "impeller blade 3 having an angle of inclination θ1" may be referred to as "inclined impeller blade 3'", and "blade stirrer 5 including inclined impeller blade 3'" may be referred to as "inclined blade stirrer 5'".

As illustrated in FIGS. 1 and 4, in the expanded particle producing apparatus according to one or more embodiments of the present invention, the blade stirrer 5 is positioned such that the ratio of a distance L1 to the depth L2 of the vessel 1 (this ratio is referred to as ratio L1/L2) is not less than 0.01 and not more than 0.2 and that the central axis of the blade stirrer 5 coincides with the central axis of the vessel 1. The distance L1 is the distance from the bottom of the vessel 1 to the center of the stirrer base 4 (which is a constituent of the blade stirrer 5 and which is provided with the impeller blade(s) 3) in the direction of the depth of the vessel 1 (i.e., in the vertical direction). The center of the stirrer base 4 in the direction of the depth of the vessel 1 (i.e., in the vertical direction) is, in other words, the center of the stirrer base 4. For achieving better vertical mixing in the vessel 1, the blade stirrer 5 is more preferably positioned such that the ratio (L1/L2) of the distance L1 to the depth L2 is not less than 0.01 and not more than 0.1.

When the ratio L1/L2 is 0.01 (lower limit), the blade stirrer 5 is provided at the lowest possible position. When the ratio L1/L2 is 0.2 (upper limit), the blade stirrer 5 is provided at the highest possible position above which good vertical mixing cannot be achieved.

In this specification, in one or more embodiments where the blade stirrer 5 includes a plurality of (two or more) impeller blades 3, the stirrer base 4 of the blade stirrer 5 serves to connect between the impeller blades 3. The stirrer base 4 may be positioned at the center of the blade stirrer 5. In embodiments where the stirrer base 4 is positioned at the center of the blade stirrer 5, the central axis of the stirrer base 4 may coincide with the central axis of the blade stirrer 5.

In one or more embodiments of the present invention, the number of stirrer bases 4 is not limited to one and may be two or more, provided that the ratio L1/L2 is not less than 0.01 and not more than 0.2 as described earlier. More specifically, the blade stirrer 5 may include two or more stirrer bases 4 with impeller blade(s) 3 which are arranged along the vertical direction (i.e., along the stirrer shaft 2), provided that the ratio L1/L2 is not less than 0.01 and not more than 0.2.

In one or more embodiments of the present invention, the shape of the stirrer base 4 is not particularly limited, and may be, for example, a cylindrical shape, a rectangular shape, a conical shape, or the like. Among these, a cylindrical shape is more preferred, because such a shape does not hinder flow at the center.

In one or more embodiments of the present invention, the materials for the impeller blade(s) 3 and the stirrer base 4 are not particularly limited. Examples of the materials include SS materials, SUS materials, other metal materials, plastic materials, and glass materials. Among these, SS materials and SUS materials are preferred for their heat resistance and pressure resistance. SUS materials are more preferred for their rust-proof properties.

In one or more embodiments of the present invention, the surface structure of the impeller blade(s) 3 is not particularly limited. Although the impeller blade(s) 3 preferably has/have a smooth surface, the smoothness is not essential. For example, the impeller blade(s) 3 may have surface asperities or may have a wavy surface. The impeller blade(s) 3 may have a through-hole passing therethrough. The surface structure of the impeller blade(s) 3 is preferably smooth in order to prevent particles and a dispersing agent from adhering thereto.

In this specification, the term "impeller blade 3" refers to a part which is attached to the stirrer base 4 and which projects from the stirrer base 4. This part, when caused to rotate, substantially makes contact with and is able to stir a solvent and materials dispersed therein.

In one or more embodiments of the present invention, the shape of each of the impeller blade(s) 3 is not particularly limited, and may be, for example, a rectangular shape, a trapezoidal shape, a polygonal shape, the shape of an arc, or the like. Specific examples of the shape of each of the impeller blade(s) 3 can be found in known books or catalogs (for example, Mixing Technology (Kakuhan Gijutsu); Satake Chemical Equipment Mfg., Ltd.)

In this specification, assuming that a line is drawn from the central axis of the stirrer shaft 2 to the farthest extremity of an impeller blade 3 perpendicularly to the central axis of the stirrer shaft 2, the length of the line is defined as "length d of impeller blade 3".

In the expanded particle producing apparatus according to one or more embodiments of the present invention, the ratio between the cylindrical portion's inner diameter D1 of the vessel 1 and the inner diameter D2 of the vessel 1 (this ratio is referred to as ratio D2/D1) is not particularly limited, and is preferably 1.0 to 0.4, more preferably 0.9 to 0.5, for achieving good vertical mixing in the vessel 1.

In the expanded particle producing apparatus according to one or more embodiments of the present invention, the length d of each of the impeller blade(s) 3 is not limited, provided that the impeller blade(s) 3 does/do not make contact with the inner wall of the vessel 1. Specifically, the ratio of the length d of each of the impeller blade(s) 3 to the inner diameter D2 of the vessel 1 (this ratio is referred to as ratio d/D2) is preferably not less than 0.255 and not more than 0.375, more preferably not less than 0.275 and not more than 0.350, for achieving good vertical mixing in the vessel 1. In contrast, many of general inclined blade stirrers 5' have a ratio d/D2 of about 0.15 to 0.25.

In this specification, "height b1 of impeller blade 3" is defined as below. Specifically, assume that the central axis of the stirrer shaft 2 is rotated while an impeller blade 3 is viewed in a direction perpendicular to the central axis of the stirrer shaft 2 to obtain a profile of the impeller blade 3, and that, when the profile is largest, a line segment parallel to the central axis of the stirrer shaft 2 is drawn on the profile such that the length of the line segment becomes maximum. The length of this line segment is defined as "height b1 of impeller blade 3".

In this specification, "width b2 of impeller blade 3" is defined as below. Specifically, assume that the central axis of the stirrer shaft 2 is rotated and an impeller blade 3 is viewed in a direction perpendicular to the central axis of the stirrer shaft 2 to obtain a profile of the impeller blade 3, and that, when the profile is smallest, a line segment is drawn on the profile so as to connect the farthest two points on the profile. The length of this line segment is defined as "width b2 of impeller blade 3", and may be referred to as "width b2" for short.

In the expanded particle producing apparatus according to one or more embodiments of the present invention, the height b1 of each of the impeller blade(s) 3 is not particularly limited, provided that the impeller blade(s) 3 does/do not make contact with the inner wall of the vessel 1. For achieving good vertical mixing in the vessel 1, it is preferable that the ratio of the height b1 of each of the impeller blade(s) 3 to the length d of each of the impeller blade(s) 3 (this ratio is referred to as ratio b1/d) is not less than 0.3 and not more than 0.7, more preferably not less than 0.35 and not more than 0.50. In contrast, many of general inclined blade stirrers 5' have a ratio b1/d of about 0.2.

In the expanded particle producing apparatus according to one or more embodiments of the present invention, the width b2 of each of the impeller blade(s) 3 is not particularly limited, provided that the impeller blade(s) 3 does/do not make contact with the inner wall of the vessel 1. For achieving good vertical mixing in the vessel 1, it is preferable that the ratio of the width b2 of each of the impeller blade(s) 3 to the length d of each of the impeller blade(s) 3 (this ratio is referred to as ratio b2/d) is not less than 0.4 and not more than 1.0, more preferably not less than 0.50 and not more than 0.70. In contrast, many of general inclined blade stirrers 5' have a ratio b2/d of about 0.3.

The expanded particle producing apparatus according to one or more embodiments of the present invention can achieve a higher degree of vertical mixing of an aqueous dispersion slurry by employing a configuration in which the ratio d/D2 and the ratio b2/d of the blade stirrer 5 are greater than those of general blade stirrers. However, if the ratio d/D2 is greater than 0.375, strong radial flow (flow in a radial direction) tends to occur and induce separation into layers, whereas, if the ratio d/D2 is less than 0.255, the resulting flow tends to be weak and reduce the degree of vertical mixing.

In one or more embodiments of the present invention, the number of impeller blades 3 of the blade stirrer 5 is not particularly limited, and preferably not less than two, more preferably two to six, even more preferably four. Such a configuration makes it possible to achieve good vertical mixing in the vessel 1. Alternatively, the following configuration may be employed: a single impeller blade 3, constituted by portions which are point-symmetric to each other with respect to the stirrer shaft 2, behaves like two impeller blades 3. In embodiments where the blade stirrer 5 includes two or more impeller blades 3, the impeller blades 3 are preferably equal in shape to each other, but may be different in shape from each other. In embodiments where the blade stirrer 5 includes two or more impeller blades 3, the impeller blades 3 are preferably arranged about the central axis of the stirrer base 4 and equally spaced apart from each other, but may be arranged not equally spaced apart from each other. In embodiments where the blade stirrer 5 according to one or more embodiments of the present invention includes two or more stirrer bases 4, the stirrer bases 4 may be equal to or different from each other in the number and positions of their impeller blades 3.

In this specification, "angle of inclination θ1 of impeller blade 3" is defined as follows. Assume that a straight line is drawn in a region where an impeller blade 3 and the stirrer base 4 are in contact with each other such that the straight line connects the uppermost point of the region with respect to the direction of the depth of the vessel 1 and the lowermost point of the region with respect to the direction of the depth of the vessel 1 (i.e., the vertical direction). The angle (acute angle) of that straight line to the direction of the depth of the vessel 1 is defined as the "angle of inclination θ1 of impeller blade 3", and may be referred to as "angle of inclination θ1" for short. The value of the angle of inclination θ1 is positive if the impeller blade 3 is inclined in the direction of rotation of the impeller blade 3 and is negative if the impeller blade 3 is inclined in the direction reverse to the direction of rotation of the impeller blade 3.

In one or more embodiments of the present invention, the impeller blade(s) 3 preferably has/have an angle of inclination θ1 of greater than 0°, that is, the impeller blade(s) 3 is/are preferably inclined in the direction of rotation of the impeller blade(s) 3, as illustrated in FIG. 3. Specifically, the impeller blade(s) 3 preferably has/have an angle of inclination θ1 of not less than 20° and not more than 70°, more preferably not less than 40° and not more than 50°.

A change in angle of inclination θ1 will result in a change in the direction of diagonal flow from the blade stirrer 5. When the angle of inclination θ1 is 20° to 70°, the direction of the resulting diagonal flow from the blade stirrer 5 is suitable for achieving good vertical mixing. If the angle of inclination θ1 is less than 20°, strong radial flow (flow in a radial direction) and weak axial flow (flow in a vertical direction) will result. If the angle of inclination θ1 is more than 70°, weak radial flow and strong axial flow will result. An angle of inclination θ1 of not less than 40° and not more than 50° is advantageous in that the direction of the resulting diagonal flow is best suited in achieving vertical mixing.

The expanded particle producing apparatus according to one or more embodiments of the present invention is configured such that the blade stirrer 5, which includes the impeller blade(s) 3 inclined at an angle of inclination θ1 falling within the foregoing range, is provided at the foregoing position (i.e., positioned such that the foregoing ratio (L1/L2) is satisfied) in the vessel 1. With this configuration, an aqueous dispersion slurry in the vessel 1 consistently flows from top to bottom, resulting in good vertical mixing. This makes it possible to reduce the number of bubbles formed (amount of bubble formation). Since the amount of bubble formation is reduced, it is possible to continue the stirring of the aqueous dispersion slurry in the vessel 1 through to the completion of the release operation. Such an expanded particle producing apparatus according to one or more embodiments of the present invention is capable of continuing to release a constant amount of the aqueous dispersion slurry from the start of the release operation through to the completion of the release operation. Since the expanded particle producing apparatus according to one or more embodiments of the present invention is capable of producing homogeneous expanded particles, the expanded particles resulting from the release operation are uniform in quality. Furthermore, since the time required for the release can be reduced, the production cycle time (time required for production) can be reduced. The expanded particle producing apparatus according to one or more embodiments of the present invention is also capable of reducing the power required for stirring.

In this specification, "bottommost line of impeller blade 3" is defined as below. Specifically, assume that an impeller blade 3 is viewed from a direction perpendicular to the central axis of the stirrer shaft 2 to obtain a profile of the impeller blade 3, and that, when the profile is largest, a horizontal line is drawn so as to pass through the midpoint of a line segment connecting the uppermost point and the lowermost point of the profile in the vertical direction. A peripheral edge defining the portion of the impeller blade 3 below the horizontal line is defined as "peripheral edge of lower portion of impeller blade 3".

Based on the above assumption, in one or more embodiments where the peripheral edge of the lower portion of the impeller blade 3 is constituted by a smooth straight line or curved line, that peripheral edge of the lower portion of the impeller blade 3 is defined as "bottommost line of impeller blade 3". On the other hand, in embodiments where the peripheral edge of the lower portion of the impeller blade 3 has some asperities, the "bottommost line of impeller blade 3" is defined as follows: an imaginary line is drawn along the bottom of the impeller blade 3 such that the peripheral edge of the lower portion of the impeller blade 3 forms a smooth straight line or curved line, that is, such that the recesses in the peripheral edge of the lower portion of the impeller blade 3 are filled and the protrusions on the peripheral edge of the lower portion of the impeller blade 3 are cut off, and this imaginary line is defined as "bottommost line of impeller blade 3". Note, here, that the portion of the impeller blade 3 connected to the stirrer base 4, that is, the portion of the impeller blade 3 in contact with the stirrer base 4, is not included in the "bottommost line of impeller blade 3".

In this specification, the shortest distance from any point on the bottommost line of the impeller blade 3 to the inner wall of the vessel 1 is referred to as "shortest distance C". The "shortest distance C from any point on the bottommost line of the impeller blade 3 to the inner wall of the vessel 1" may be referred to as "shortest distance C between bottommost line of impeller blade 3 and inner wall of vessel 1".

In the expanded particle producing apparatus according to one or more embodiments of the present invention, the shortest distance C between the bottommost line of the impeller blade(s) 3 and the inner wall of the vessel 1 is not particularly limited; however, in order to achieve good vertical mixing in the vessel 1, the shortest distance C is preferably 5 mm to 100 mm, more preferably 5 mm to 75 mm, even more preferably 5 mm to 50 mm, particularly preferably 5 mm to 30 mm. The percentage of the portion of the bottommost line of the impeller blade 3 where the shortest distance C is 5 mm to 100 mm is not particularly limited; however, in order to achieve good vertical mixing in the vessel 1, the percentage is preferably not less than 60%, more preferably not less than 70%, even more preferably not less than 80%, particularly preferably not less than 90% (upper limit is 100%) of the bottommost line of the impeller blade 3.

The expanded particle producing apparatus according to one or more embodiments of the present invention is preferably configured such that, in 60% or more of the bottommost line of the impeller blade(s) 3, the shortest distance C (i.e., shortest distance from any point on the bottommost line of the impeller blade(s) 3 to the inner wall of the vessel 1) is 5 mm to 100 mm, particularly preferably 5 mm to 30 mm.

Figure 5:
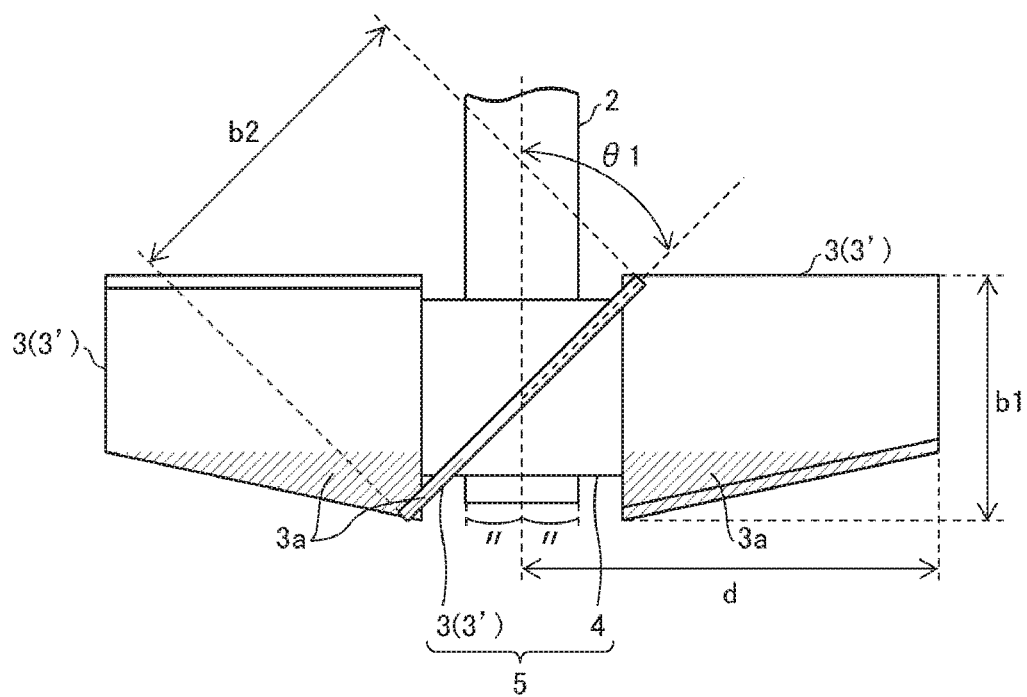
FIG. 5 is an elevational view illustrating one example of another shape of a blade stirrer for use in an expanded particle producing apparatus according to one or more embodiments of the present invention.
Figure 7:
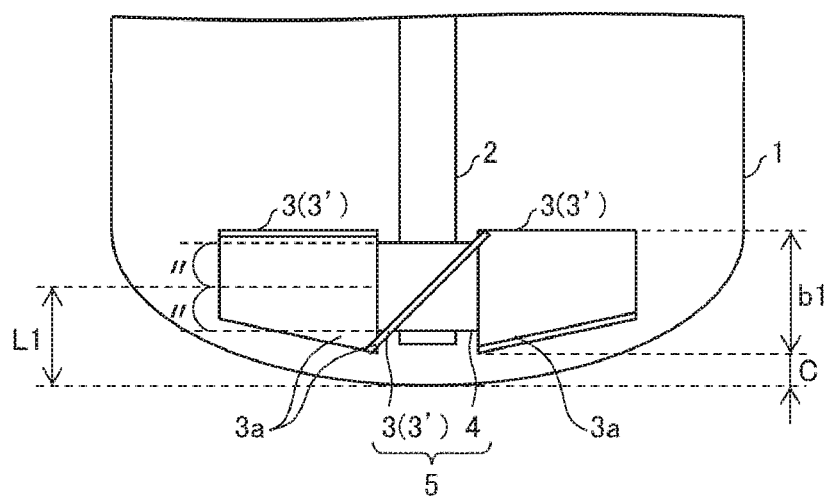
FIG. 7 is an elevational view schematically illustrating where in a vessel a blade stirrer, which is constituted by impeller blades each having an extended portion, is provided in an expanded particle producing apparatus according to one or more embodiments of the present invention.

In the expanded particle producing apparatus according to one or more embodiments of the present invention, the impeller blade(s) 3 has/have the above-described bottommost line, which means that the lower portion of each of the impeller blade(s) 3 has a shape that substantially matches the shape of the bottom of the vessel 1. FIG. 5 is an elevational view illustrating one example of another shape of the blade stirrer 5 for use in the expanded particle producing apparatus according to one or more embodiments of the present invention. The blade stirrer 5 in FIG. 5 is provided with impeller blades 3 each including, at its lower portion, an extended portion 3a (hatched portion in FIG. 5) that matches the shape of the bottom of the vessel 1. FIG. 7 is an elevational view schematically illustrating where in the vessel 1 the blade stirrer 5, which is constituted by impeller blades 3 each including the extended portion 3a, is provided in the expanded particle producing apparatus according to one or more embodiments of the present invention.

The configuration "the lower portion of the impeller blade 3 has a shape that substantially matches the shape of the bottom of the vessel 1" may be obtained by, for example, as illustrated in FIGS. 5 and 7, proving the extended portion 3a at the lower portion of each inclined impeller blade 3'. Although the shape of the extended portion 3a in FIGS. 5 and 7 is a triangular shape, the shape of the extended portion 3a is not particularly limited. The shape of the extended portion 3a may be the shape of an arc or a polygonal shape so as to be more similar to the shape of the bottom of the vessel 1. When the distance between the bottom of the vessel 1 and the lower portion of the impeller blade 3 is more uniform, the aqueous dispersion slurry more smoothly flows between the bottom of the vessel 1 and the blade stirrer 5. In one or more embodiments where the extended portion 3a is provided in order to make the distance from the bottom of the vessel 1 to the lower portion of the impeller blade 3 more uniform, the extended portion 3a is positioned such that the shortest distance C from the bottom of the vessel 1 to the lower portion of the impeller blade 3 is greater than 0 mm.

Figure 6A:
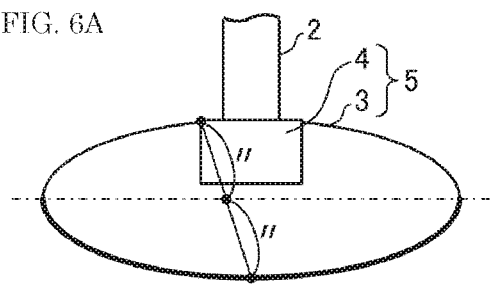
FIGS. 6A-6E schematically illustrate specific examples of the shape of a blade stirrer for use in an expanded particle producing apparatus according to one or more embodiments of the present invention, and illustrates specific examples of the bottommost line of an impeller blade of each blade stirrer.
Figure 6B:
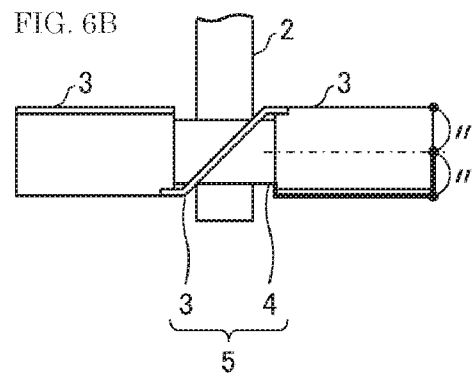
Figure 6C:
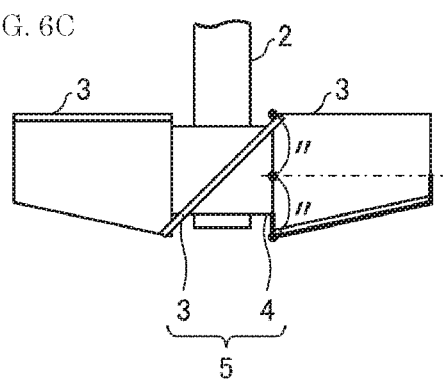
Figure 6D:
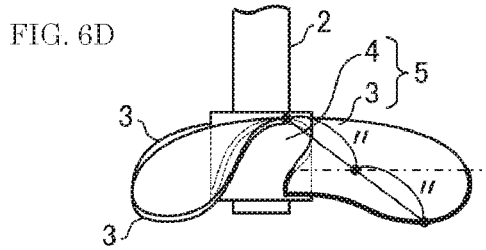
Figure 6E:
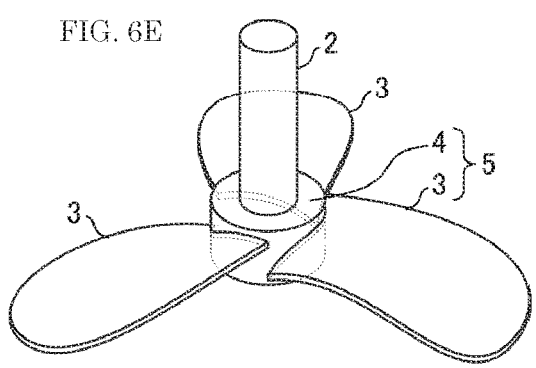

FIGS. 6A-6E schematically illustrate specific examples of the shape of the blade stirrer 5 for use in the expanded particle producing apparatus according to one or more embodiments of the present invention, and illustrates specific examples of the bottommost line of an impeller blade 3 of each blade stirrer 5. In FIGS. 6A-6D, the bottommost line of an impeller blade 3 of each blade stirrer 5 is drawn in bold line as compared to the other lines constituting the drawings. FIG. 6A is an elevational view illustrating a blade stirrer 5 constituted by a single impeller blade 3. FIG. 6B is an elevational view illustrating a blade stirrer 5 constituted by impeller blades 3 each of which has an angle of inclination and includes bent portions. FIG. 6C is an elevational view illustrating a blade stirrer 5 constituted by impeller blades 3 each including an extended portion 3a so as to match the shape of the bottom of the vessel 1, as illustrated in FIG. 5. FIG. 6D is an elevational view illustrating a blade stirrer 5 constituted by impeller blades 3 in the form of a propeller. FIG. 6E is a perspective view illustrating the blade stirrer 5 of FIG. 6D viewed from a different angle (from a different point of view). The blade stirrer 5 for use in the expanded particle producing apparatus according to one or more embodiments of the present invention preferably has a shape such that, in 60% or more of the bottommost line of each impeller blade 3, the shortest distance C (i.e., shortest distance from any point on the bottommost line of each impeller blade 3 to the inner wall of the vessel 1) is 5 mm to 100 mm, and more preferably has a shape that makes the distance from the bottom of the vessel 1 to the lower portion of the impeller blade 3 more uniform.

[1-3. Baffle 10]

The expanded particle producing apparatus according to one or more embodiments of the present invention preferably includes at least one baffle 10 in the vessel 1 in order to achieve better vertical mixing in the vessel 1. When the baffle(s) 10 is/are positioned near the lateral wall of the vessel 1, vertical mixing in the vessel 1 further improves. FIGS. 8A-8C show elevational views schematically illustrating examples of a baffle 10 provided to the expanded particle producing apparatus according to one or more embodiments of the present invention. FIGS. 8A and 8B are elevational views illustrating baffles 10 each including an inclined portion 12 at the upper portion thereof. FIG. 8C is an elevational view illustrating a baffle 10 which itself is inclined. As illustrated in FIGS. 8A and B, the baffle 10, which includes a vertical portion 11 extending along the vertical direction in the vessel 1, may also include an inclined portion 12 that is inclined toward the center of the vessel 1. Alternatively, the baffle 10 may be provided inside the vessel 1 such that the baffle 10 itself is inclined toward the center of the vessel 1, as illustrated in FIG. 8C. The baffle 10 preferably includes the inclined portion 12 for achieving better vertical mixing in the vessel 1. In this specification, the length of the baffle 10 in the vertical direction is defined as a total length L4 of the baffle 10 in the direction of the depth of the vessel 1, and is referred to as "total length L4 of baffle 10". This may be referred to as "total length L4" for short. In one or more embodiments where the baffle 10 includes the inclined portion 12, the length of the inclined portion 12 in the vertical direction is defined as a length L3 of the inclined portion 12 in the direction of the depth of the vessel 1, and is referred to as "length L3 of inclined portion 12". This may be referred to as "length L3" for short. More specifically, the length L3 of the inclined portion 12 refers to the distance, in the vertical direction, from (i) the uppermost end of the inclined portion 12 in the direction of the depth of the vessel 1 (this uppermost end is located on the centerline in the width and thickness directions of the vertical portion 11) to (ii) the intersection of the centerline in the width and thickness directions of the inclined portion 12 and the centerline in the width and thickness direction of the vertical portion 11. The baffle 10 including the inclined portion 12 is preferably configured such that the ratio of the length L3 to the total length L4 (this ratio is referred to as ratio L3/L4) is not less than 0.2 and not more than 0.8, for achieving better vertical mixing in the vessel 1.

In this specification, the angle (acute angle) between the vertical portion 11 and the inclined portion 12 of the baffle 10 is defined as an angle of inclination θ2 of the baffle 10, and may be referred to as "angle of inclination θ2" for short. More specifically, the angle of inclination θ2 refers to the acute one of the angles that the centerline of the vertical portion 11 in the width and thickness directions (in other words, the line in the vertical direction) forms with the centerline of the inclined portion 12 in the width and thickness directions. When the baffle 10 for use in one or more embodiments of the present invention includes the inclined portion 12, the inclined portion 12 may include a plurality of bent portions or may be inclined so as to form a gentle curve. In embodiments where the inclined portion 12 includes a plurality of bent portions or is inclined so as to form a gentle curve, the angle of inclination θ2 is the angle between the vertical portion 11 and the portion of the inclined portion 12 nearest the vertical portion 11. For achieving easy production and achieving an effect (better vertical mixing in vessel 1), it is more preferable that the inclined portion 12 of the baffle 10 for use in one or more embodiments of the present invention is in a linear shape.

A preferred shape of the baffle 10 which is for use in one or more embodiments of the present invention and which includes the inclined portion 12 is not particularly limited. The angle of inclination θ2 is preferably not less than 0°, more preferably not less than 2° and not more than 60°. With the use of the baffle 10 in which the ratio L3/L4 is 0.2 to 0.8 and the angle of inclination θ2 is 2° to 60°, even if the aqueous dispersion slurry is contained in the vessel 1 up to the level near the top of the vessel 1, the portion of the aqueous dispersion slurry at the surface near the inner wall of the vessel 1 can be drawn into the center of the vessel 1. This makes it possible to improve the degree of mixing of the aqueous dispersion slurry.

With the use of the baffle 10 shaped as describe above, no stagnation of aqueous dispersion slurry occurs even near the baffle 10 at the surface of the aqueous dispersion slurry in the vessel 1, and a downward flow from the center of the surface of the aqueous dispersion slurry toward the bottom becomes strong. This makes it possible to further improve the degree of vertical mixing of the aqueous dispersion slurry. Since the degree of vertical mixing improves, it is possible to reduce the number of rotations for stirring (rpm), and thus possible to reduce the power required for stirring. It is also possible to reduce unit energy for stirring. As used herein, the term "the number of rotations for stirring (rpm)" refers to the number of rotations of the blade stirrer 5 per minute.

The material for the baffle 10 is not particularly limited, and examples of the material for the baffle 10 include SS materials, SUS materials, other metal materials, plastic materials, and glass materials. Among these, SS materials and SUS materials are preferred for their heat resistance and pressure resistance. SUS materials are more preferred for their rust-proof properties.

The surface structure of the baffle 10 is not particularly limited. Although the baffle 10 preferably has a smooth surface, the smoothness is not essential. For example, the baffle 10 may have surface asperities or may have a wavy surface. The baffle 10 may have a through-hole passing therethrough. The surface structure of the baffle 10 is preferably smooth in order to prevent particles and a dispersing agent from adhering thereto.

The baffle 10 may be attached to the inner wall of the vessel 1 with a support member made of the same material as or different material from the baffle 10.

Figure 9:
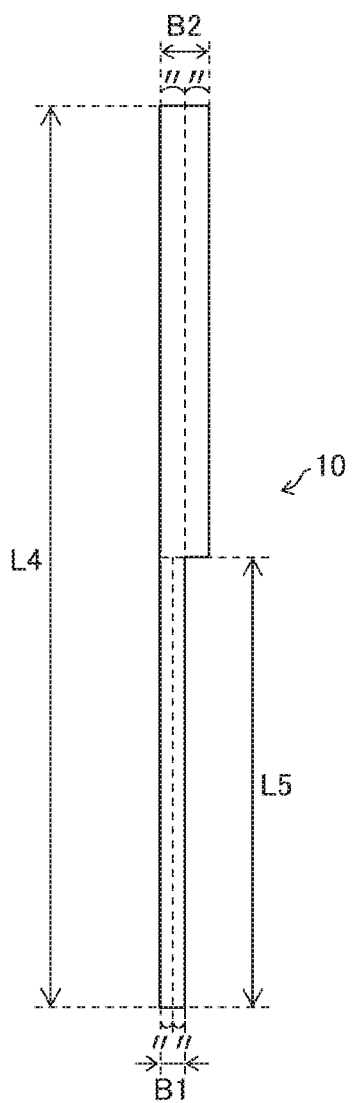
FIG. 9 is an elevational view schematically illustrating another example of a baffle provided to an expanded particle producing apparatus according to one or more embodiments of the present invention. The baffle is wider at its upper portion than at its lower portion.

FIG. 9 is an elevational view schematically illustrating another example of the baffle 10 provided to the expanded particle producing apparatus according to one or more embodiments of the present invention. The baffle 10 in FIG. 9 is wider at its upper portion than at its lower portion. Another example of the shape of the baffle 10 provided to the vessel 1 of the expanded particle producing apparatus according to one or more embodiments of the present invention is the shape as illustrated in FIG. 9, that is, the shape such that the baffle 10 has respective different widths at its upper portion and lower portion. The baffle 10 according to one or more embodiments of the present invention is particularly preferably wider at its upper portion than at its lower portion. In this specification, the portion of the baffle 10 that has a smaller width is referred to as "narrow portion of baffle 10" and may be referred to as "narrow portion" for short, and the portion of the baffle 10 that has a greater width is referred to as "wide portion of baffle 10" and may be referred to as "wide portion" for short. Furthermore, in this specification, the length of the narrow portion of the baffle 10 in the vertical direction is defined as a length L5 of the narrow portion of the baffle 10 and referred to as "length L5 of narrow portion", or may be referred to as "length L5" for short. Moreover, in this specification, the "width of wide portion of baffle 10" refers to the width at the widest point of the wide portion, and the "width of narrow portion of baffle 10" refers to the width at the narrowest point of the narrow portion. Moreover, in this specification, the width of the wide portion of the baffle 10 is defined as a width B2, and the width of the narrow portion of the baffle 10 is defined as a width B1, as illustrated in FIG. 9. In this specification, the width B2 of the wide portion of the baffle 10 may be referred to as "width B2 of wide portion" for short, and the width B1 of the narrow portion of the baffle 10 may be referred to as "width B1 of narrow portion" for short. In FIG. 9, the baffle 10 has clearly different widths between the upper and lower portions; however, such a difference in width of the baffle 10 between the upper portion and the lower portion may be a gradual transition. In embodiments where the width of the baffle 10 starts changing at a certain point and gradually changes (increases) from bottom to top, the uppermost end of the narrow portion, in other words, the uppermost end of the length L5, is the above-mentioned certain point at which the width of the baffle 10 starts changing.

In one or more embodiments of the present invention, it is preferable that any of the following conditions (1) to (3) is/are satisfied: (1) "narrow portion of baffle 10" is positioned lower than "wide portion of baffle 10"; (2) the ratio of the length L5 to the length L4 (this ratio is referred to as ratio L5/L4) is not less than 0.2 and not more than 0.8; and (3) it is preferable that B2>B1, and the ratio B1/B2 is not less than 0.2 and not more than 0.8. Any of the conditions (1) to (3) may be satisfied individually or two or more of them may be satisfied in combination. In embodiments where any of the conditions (1) to (3) is satisfied individually or two or more of them are satisfied in combination, this brings about an effect of achieving good vertical mixing of the aqueous dispersion slurry.

The thickness of the baffle 10 is not particularly limited, provided that the baffle 10 is thick enough to withstand the pressure from the aqueous dispersion slurry during stirring.

With the use of the baffle 10 shaped as described above, it is possible to reduce the power required for stirring, and thus possible to reduce bubble formation. The width B2 of the wider portion located at the upper portion of the baffle 10 is preferably large, in order to cause a portion of the aqueous dispersion slurry at the surface near the inner wall of the vessel 1 to be drawn into the center of the vessel 1 and to thereby improve the degree of mixing of the aqueous dispersion slurry even if the aqueous dispersion slurry is contained in the vessel 1 up to the level near the top of the vessel 1. On the other hand, the width B1 of the narrow portion located at the lower portion of the baffle 10 is preferably small, in order to achieve a higher degree of mixing of the aqueous dispersion slurry and to thereby reduce the power required for stirring even when the level of the aqueous dispersion slurry contained in the vessel 1 is lowered. The length L5 of the narrow portion of the baffle 10 is more preferably about half the total length L4 of the baffle 10 (i.e., L5/L4=about 0.5), and the width B1 of the narrow portion located at the lower portion of the baffle 10 is about half the width B2 of the wide portion located at the upper portion of the baffle 10 (i.e., B1/B2=about 0.5). This achieves better vertical mixing of the aqueous dispersion slurry.

Figure 10:
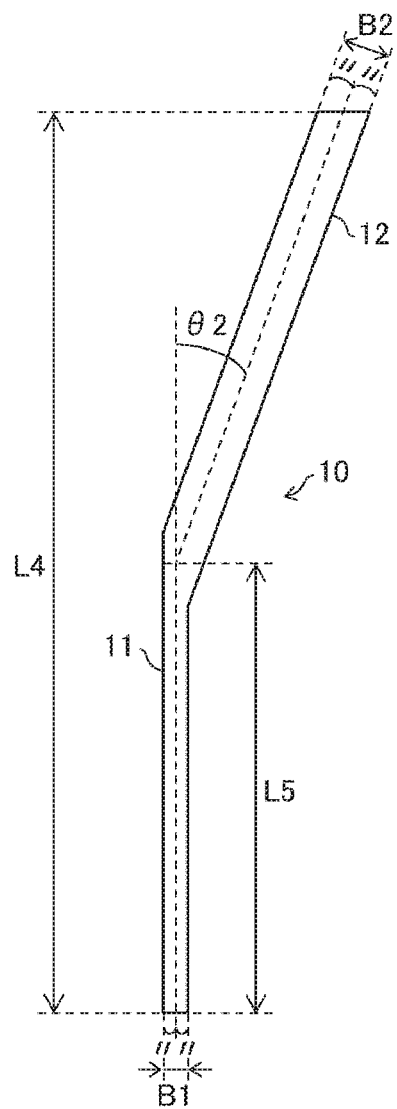
FIG. 10 is an elevational view schematically illustrating a further example of a baffle provided to an expanded particle producing apparatus according to one or more embodiments of the present invention. The baffle includes, at its upper portion, an inclined portion that is wider than the lower portion.

FIG. 10 is an elevational view schematically illustrating a further example of the baffle 10 provided to the expanded particle producing apparatus according to one or more embodiments of the present invention. The baffle 10 in FIG. 10 includes, at its upper portion, an inclined portion 12 that is wider than the lower portion. The baffle 10 provided to the vessel 1 of the expanded particle producing apparatus according to one or more embodiments of the present invention more preferably includes the inclined portion 12 at its upper portion and that the upper portion is larger in width than the lower portion.

Figure 11:
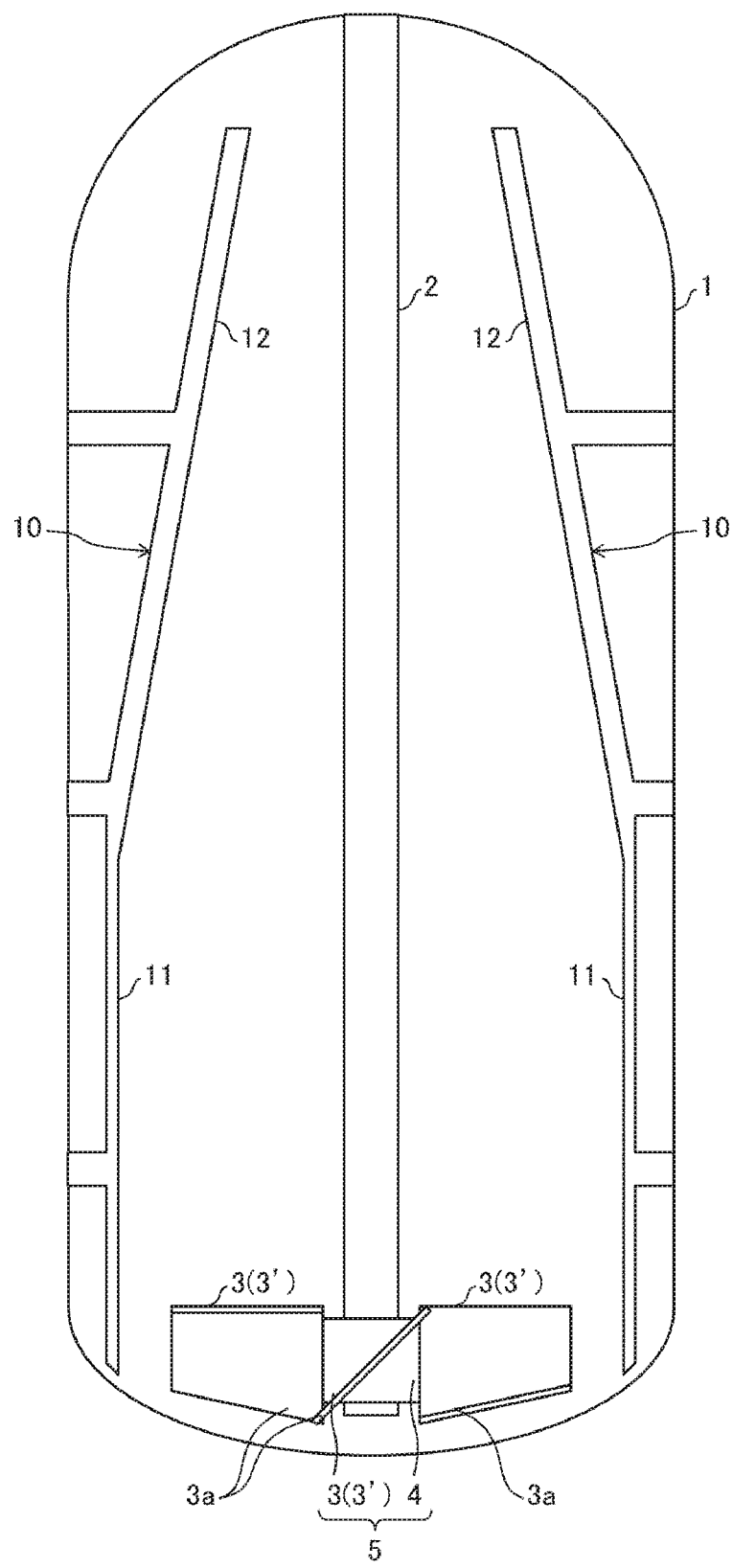
FIG. 11 is an elevational view schematically illustrating an expanded particle producing apparatus according to one or more embodiments of the present invention provided with (i) a blade stirrer constituted by impeller blades each including an extended portion and (ii) baffles each including a wide inclined portion at its upper portion.

FIG. 11 is an elevational view schematically illustrating an expanded particle producing apparatus according to one or more embodiments of the present invention provided with (i) a blade stirrer 5 constituted by impeller blades 3 each including an extended portion 3a and (ii) baffles 10 each including a wide inclined portion 12 at its upper portion. With the use of an expanded particle producing apparatus configured like above, it is possible to achieve a higher degree of vertical mixing of the aqueous dispersion slurry and to reduce bubble formation. The expanded particle producing apparatus may be configured such that the number of rotations for stirring decreases according to the level of the aqueous dispersion slurry contained in the vessel 1, during the process of producing expanded particles by releasing the aqueous dispersion slurry containing polyolefin resin particles into an atmosphere having a pressure lower than the internal pressure of the vessel 1 by opening one end of the vessel 1 (this configuration will be described later). This makes it possible to further reduce the formation of bubbles of the aqueous dispersion slurry, and possible to release a constant amount of the aqueous dispersion slurry in an improved manner.

The following description will discuss materials for use in producing expanded particles through a method of producing expanded particles according to one or more embodiments of the present invention.

<2. Material for Expanded Particles>

[2-1. Polyolefin Resin]

A polyolefin resin serving as a base resin of polyolefin-based resin expanded particles according to one or more embodiments of the present invention refers to a resin that contains olefin unit in an amount of not less than 50 wt %, preferably not less than 80 wt %, more preferably not less than 90 wt %. Specific examples of the polyolefin resin include: polyethylenes such as high-density polyethylenes, medium-density polyethylenes, low-density polyethylenes, linear low-density polyethylenes, and low-molecular-weight polyethylenes; propylene homopolymers; polypropylenes such as α-olefin-propylene random copolymers (e.g., ethylene-propylene random copolymers, ethylene-propylene-1-butene random copolymers, propylene-1-butene random copolymers) and α-olefin-propylene block copolymers; other polyolefin homopolymers such as propylene homopolymers and polybutene; and the like. These resins may be used individually or two or more of them may be used in combination.

Among those listed above, ethylene-propylene random copolymers, ethylene-propylene-1-butene random copolymers, and propylene-1-butene random copolymers are suitable for use because of their good expandability when formed into expanded particles.

The base resin in one or more embodiments of the present invention may further contain some other thermoplastic resin such as polystyrene, polybutene, ionomer, and/or the like in addition to the polyolefin resin, provided that the characteristics of the polyolefin resin are not lost.

It is usually preferable that the polyolefin resin in one or more embodiments of the present invention is allowed to melt with the use of an extruder, kneader, Banbury mixer, roll, or the like and is processed into resin particles (in other words, polyolefin resin particles) in the form of cylinders, ovals, spheres, cubes, cuboids, or the like in advance for easy production of expanded particles. The resin particles may be referred to as pellets.

The weight of the polyolefin resin particles in one or more embodiments of the present invention is preferably 0.1 to 30 mg per particle, more preferably 0.3 to 10 mg per particle.

[2-2. Additive]

In one or more embodiments where some additive is added to the polyolefin resin, it is preferable that the polyolefin resin and the additive(s) are mixed together with the use of a blender or the like prior to the production of the polyolefin resin particles. Specific examples of the additive(s) include cell nucleating agents (may be referred to as nucleating agents for short). In one or more embodiments where a hydrocarbon-based expanding agent such as propane, butane, pentane, or hexane is used, a usually used nucleating agent is an inorganic nucleating agent such as talc, silica, calcium carbonate, kaolin, titanium oxide, bentonite, or barium sulfate. The amount of the cell nucleating agent added differs depending on the type of polyolefin resin and the type of cell nucleating agent, and therefore cannot be definitely specified; however, the amount of the cell nucleating agent is preferably not less than about 0.001 parts by weight and not more than 2 parts by weight relative to 100 parts by weight of the polyolefin resin.

In one or more embodiments where an inorganic expanding agent such as air, nitrogen, carbon dioxide, or water is used, it is preferable to use the foregoing inorganic nucleating agent and/or a hydrophilic substance. In embodiments where water is used as a dispersion medium for the aqueous dispersion slurry, the water penetrates into the polyolefin resin and the water alone or together with another expanding agent functions as an expanding agent.

The hydrophilic substance serves to increase the amount of water penetrating into the polyolefin resin. Specific examples of the hydrophilic substance include: inorganic substances such as sodium chloride, calcium chloride, magnesium chloride, borax, and zinc borate; and organic substances. Examples of the organic substances include: glycerin, melamine, isocyanuric acid, melamine-isocyanuric acid condensate; polyethers such as polyethylene glycol and polyethylene oxide, adducts obtained by addition of a polyether to polypropylene or the like, and polymer alloys of these substances; and polymers such as alkali metal salts of ethylene-(meth)acrylic acid copolymers, alkali metal salts of butadiene-(meth)acrylic acid copolymers, alkali metal salts of carboxylated nitrile rubbers, alkali metal salts of isobutylene-maleic anhydride copolymers, and alkali metal salts of poly(meth)acrylic acids. These hydrophilic substances may be used individually or two or more of them may be used in combination.

The amount of the hydrophilic substance added is preferably not less than 0.005 parts by weight and not more than 2 parts by weight, more preferably not less than 0.005 parts by weight and not more than 1 part by weight, relative to 100 parts by weight of the polyolefin resin. By changing the type and/or amount of the hydrophilic substance, it is possible to adjust the average cell diameter of the resulting polyolefin-based resin expanded particles.

When polyolefin resin particles are produced, some additive such as a colorant, an antistatic agent, an antioxidant, a phosphorus-based processing stabilizer, a lactone-based processing stabilizer, a metal deactivator, a benzotriazole-based ultraviolet absorber, a benzoate-based photo stabilizer, a hindered amine-based photo stabilizer, a flame retarder, a flame retardant aid, an acid neutralizer, a crystal nucleating agent, and/or an amide-based additive can be added depending on need, provided that the characteristics of the polyolefin resin are not lost.

[2-3. Expanding Agent]

Examples of an expanding agent that can be used include: volatile hydrocarbon-based expanding agents such as propane, isobutane, butane, pentane, and hexane; and inorganic gases such as air, nitrogen, carbon dioxide, and water. These expanding agents may be used individually or two or more of them may be used in combination.

[2-4. Dispersing Agent and Dispersion Auxiliary Agent]

A preferred aqueous dispersion medium is water. The aqueous dispersion medium can alternatively be a dispersion medium obtained by adding methanol, ethanol, ethylene glycol, glycerin, and/or the like to water.

The aqueous dispersion medium preferably contains a dispersing agent in order to prevent polyolefin resin particles from agglomerating. Specific examples of the dispersing agent include inorganic dispersing agents such as tertiary calcium phosphate, tertiary magnesium phosphate, titanium oxide, basic magnesium carbonate, calcium carbonate, barium sulfate, kaolin, talc, and clay. Among these, tertiary calcium phosphate, barium sulfate, and kaolin are more preferred because even a small amount of such a dispersing agent makes polyolefin resin particles stably dispersed in the aqueous dispersion slurry within the vessel 1.

It is preferable that a dispersion auxiliary agent is used in addition to the dispersing agent. Examples of the dispersion auxiliary agent include: anionic surfactants of carboxylate type such as N-acylamino acid salt, alkyl ether carboxylates, and acyl peptide; anionic surfactants of sulfonate type such as alkylsulfonates, alkyl benzene sulfonates, alkyl naphthalene sulfonates, and sulfosuccinate; anionic surfactants of sulfate ester type such as sulfonated oil, alkyl sulfates, alkyl ether sulfates, and alkyl amide sulfates; anionic surfactants of phosphate ester type such as alkyl phosphates, polyoxyethylene phosphate, and alkyl allyl ether sulfates; and the like. Examples of the dispersion auxiliary agent further include polyanionic polymer surfactants such as: maleic acid copolymer salt; polymer surfactants of polycarboxylic acid type such as polyacrylate; polystyrene sulfonate and naphthalene sulfonic acid formalin condensate salt; and the like.

The dispersion auxiliary agent is preferably an anionic surfactant of sulfonate type, and is more preferably one selected from alkylsulfonates and alkyl benzene sulfonates or a mixture of two or more selected from alkylsulfonates and alkyl benzene sulfonates. The dispersion auxiliary agent is more preferably an alkylsulfonate, and is particularly preferably an alkylsulfonate that contains a C10-C18 linear carbon chain as a hydrophobic group, because such an alkylsulfonate makes it possible to reduce the amount of the dispersing agent adhering to polyolefin-based resin expanded particles.

In one or more embodiments of the present invention, it is particularly preferable that at least one selected from tertiary calcium phosphate, tertiary magnesium phosphate, barium sulfate, and kaolin is used as a dispersing agent and n-paraffin sodium sulfonate is used as a dispersion auxiliary agent in combination with the dispersing agent.

The amounts of the dispersing agent and the dispersion auxiliary agent differ depending on the types of the dispersing agent and the dispersion auxiliary agent used and the type and amount of the polyolefin resin used. Usually, the dispersing agent is contained in an amount of preferably not less than 0.1 parts by weight and not more than 5 parts by weight, more preferably not less than 0.2 parts by weight and not more than 3 parts by weight, relative to 100 parts by weight of the aqueous dispersion medium. The dispersion auxiliary agent is contained in an amount of preferably not less than 0.001 parts by weight and not more than 0.3 parts by weight, more preferably not less than 0.001 parts by weight and not more than 0.1 parts by weight, relative to 100 parts by weight of the aqueous dispersion medium. For better dispersibility of polyolefin resin particles in the aqueous dispersion medium, usually the amount of the polyolefin resin particles is preferably not less than 20 parts by weight and not more than 100 parts by weight relative to 100 parts by weight of the aqueous dispersion medium. With this configuration, it is possible to make the polyolefin resin particles stably dispersed in the aqueous dispersion medium within the vessel 1.

<3. Method of Producing Expanded Particles>

Expanded particles according to one or more embodiments of the present invention are produced by using the foregoing expanded particle producing apparatus according to one or more embodiments of the present invention.

Specifically, a method of producing expanded particles according to one or more embodiments of the present invention is a method of producing expanded particles by: dispersing polyolefin resin particles in a vessel 1 with water and a dispersing agent; maintaining the internal temperature and the internal pressure of the vessel 1 at a certain temperature and a certain pressure; and thereafter releasing the polyolefin resin particles to an atmosphere having a pressure lower than the internal pressure of the vessel 1. The method includes a step of stirring an aqueous dispersion slurry inside the vessel 1 with use of a blade stirrer 5 including a stirrer base 4 and an impeller blade(s) 3 attached to the stirrer base 4, the blade stirrer 5 being positioned such that the ratio $L1/L2$ of the distance $L1$ to the depth $L2$ is not less than 0.01 and not more than 0.2 and that the central axis of the blade stirrer 5 coincides with the central axis of the vessel 1, the distance $L1$ being the distance from the bottom of the vessel 1 to the center of the stirrer base 4 in the direction of the depth of the vessel 1, the depth $L2$ being the depth of the vessel 1.

The method of producing expanded particles using an expanded particle producing apparatus according to one or more embodiments of the present invention is not limited to a particular method, provided that the expanded particle producing apparatus according to one or more embodiments of the present invention is used. For example, the method is a combination of the following steps:

(i) a step including dispersing the polyolefin resin particles in an aqueous dispersion medium within a vessel 1 and adding an expanding agent (stirring step);

(ii) a step including raising the temperature inside the vessel 1 to a temperature equal to or above the softening temperature of the polyolefin resin and raising the pressure inside the vessel 1 to thereby allow the expanding agent to be impregnated into the polyolefin resin particles; and (iii) a step of producing polyolefin-based resin expanded particles by opening one end of the vessel 1 and thereby releasing the aqueous dispersion slurry containing the polyolefin resin particles into an atmosphere having a pressure lower than the internal pressure of the vessel 1 after step (ii).

According to the above production method, it is possible to adjust the expansion ratio of the polyolefin-based resin expanded particles by: changing the level to which the internal temperature of the vessel 1 is to be raised and/or the level to which the internal pressure of the vessel 1 is to be raised; and/or changing the temperature and/or pressure of the atmosphere into which the aqueous dispersion slurry is to be released.

The atmosphere having a pressure lower than the internal pressure of the vessel 1 in one or more embodiments of the present invention is not particularly limited, provided that the atmosphere is a low-pressure atmosphere into which the aqueous dispersion slurry is released from the vessel 1. For example, in embodiments where the aqueous dispersion slurry is released into the air, the foregoing atmosphere is an atmosphere with atmospheric pressure. In embodiments where the aqueous dispersion slurry is released into a closed system for recovery of the volatile expanding agent, the foregoing atmosphere is the atmosphere inside the closed system. The polyolefin-based resin expanded particles, expanded as a result of release into a low-pressure atmosphere, are subjected to moisture removal and then further dried, and thereby dry expanded particles are obtained.

The method of producing expanded particles according to one or more embodiments of the present invention uses an expanded particle producing apparatus according to one or more embodiments of the present invention, and is thereby capable of reducing bubble formation in the stirring step of stirring the aqueous dispersion slurry containing polyolefin resin particles.

In this specification, the height in the vertical direction of a bubble layer formed by the aqueous dispersion slurry within the vessel 1 in the method of producing expanded particles according to one or more embodiments of the present invention is defined as "height $L6$ in vertical direction of bubble layer in vessel 1", and may be referred to as "height $L6$ of bubble layer" or "height $L6$" for short. The height $L6$ of the bubble layer is not particularly limited. In order to reduce the amount of particles remaining within the vessel 1 after particle release, the ratio of the height $L6$ to the depth $L2$ of the vessel 1 (such a ratio is referred to as ratio $L6/L2$) is preferably not more than 0.11, more preferably not more than 0.10, even more preferably not more than 0.09, particularly preferably not more than 0.08. The definition of the height $L6$ of the bubble layer and a method of determining the height $L6$ will be described later in Examples.

According to the method of producing expanded particles according to one or more embodiments of the present invention, an expanded particle producing apparatus according to one or more embodiments of the present invention is used, and therefore it is possible to cause the aqueous dispersion slurry in the vessel 1 to consistently flow from top to bottom. That is, it is possible to achieve good vertical mixing. It is also possible to evaluate the degree of vertical mixing in the vessel 1 by finding the ratio of the weight percentage $Wa$ (%) of polyolefin resin particles in the aqueous dispersion slurry at the surface of the aqueous dispersion slurry in the vessel 1 to the weight percentage $Wb$ (%) of polyolefin resin particles in the aqueous dispersion slurry at the bottom of the vessel 1 (such a ratio is referred to as ratio $Wb/Wa$) during the production process for expanded particles. The weight percentage $Wa$ (%) and the weight percentage $Wb$ (%) are obtained by, after stirring of the aqueous dispersion slurry containing polyolefin resin particles, extracting some polyolefin resin particles from a portion at the surface of the aqueous dispersion slurry in the vessel 1 and extracting some polyolefin resin particles from a portion at the bottom. The definitions of the weight percentage $Wa$ (%) and weight percentage $Wb$ (%) and a method of determining the weight percentage $Wa$ (%) and weight percentage $Wb$ (%) will be described later in Examples. In this specification, the weight percentage $Wa$ of polyolefin resin particles at the surface of the aqueous dispersion slurry in the vessel 1 is referred to as "weight percentage $Wa$ at the surface" or "weight percentage $Wa$" for short, and the weight percentage $Wb$ of polyolefin resin particles at the bottom of the vessel 1 is referred to as "weight percentage $Wb$ at the bottom" or "weight percentage $Wb$" for short.

According to the method of producing expanded particles according to one or more embodiments of the present invention, the foregoing ratio ($Wb/Wa$) is not particularly limited, but is preferably not less than 0.5 and less than 1.0, more preferably not less than 0.7 and less than 1.0, even more preferably not less than 0.8 and less than 1.0, particularly preferably not less than 0.9 and less than 1.0, for homogeneity of the resulting expanded particles. The ratio (Wb/Wa) is preferably as close as possible to 1, for better homogeneity of the resulting expanded particles.

The power required for stirring relative to the number of rotations for stirring indicates energy that influences production cost in the method of producing expanded particles according to one or more embodiments of the present invention, and depends on the capacity M (liter) of the vessel 1. A smaller power required for stirring is more advantageous in terms of production cost. In view of this, in the present embodiment, "unit energy for stirring" in the method of producing expanded particles according to one or more embodiments of the present invention can be defined by the following equation:

Unit energy for stirring=$(P/(R \times M)) \times 10^3$ where R (number of times) is the total number of rotations for stirring with the blade stirrer 5 within a certain period of time, P (kJ) is the total power required for stirring within the certain period of time, and M is the capacity of vessel 1.

According to the method of producing expanded particles according to one or more embodiments of the present invention, since an expanded particle producing apparatus according to one or more embodiments of the present invention is used, it is possible to keep the unit energy for stirring low. In the method of producing expanded particles according to one or more embodiments of the present invention, the unit energy for stirring is not particularly limited, but is preferably not less than 0 and not more than 5, more preferably not less than 0 and not more than 4, even more preferably not less than 0 and not more than 3.5, for better cost performance.

According to the method of producing expanded particles according to one or more embodiments of the present invention, an expanded particle producing apparatus according to one or more embodiments of the present invention is used, and therefore it is possible, when producing expanded particles by releasing an aqueous dispersion slurry containing polyolefin resin particles into an atmosphere having a pressure lower than the internal pressure of the vessel 1, to shorten the time for the aqueous dispersion slurry to be entirely released.

In the method of producing expanded particles according to one or more embodiments of the present invention, the time for the aqueous dispersion slurry to be entirely released is not particularly limited, but is preferably shorter.

The expansion ratio of polyolefin resin particles obtained in one or more embodiments of the present invention is not particularly limited, but is preferably 2 to 60 times, more preferably 3 to 40 times. High-expansion-ratio expanded particles can be produced by further expanding expanded particles obtained in one or more embodiments of the present invention. Specifically, high-expansion-ratio expanded particles can be obtained by applying an internal pressure to expanded particles with the use of air or the like and heating, with steam or the like, the expanded particles having the internal pressure to thereby further expand them.

According to the method of producing expanded particles according to one or more embodiments of the present invention, since an expanded particle producing apparatus according to one or more embodiments of the present invention is used, it is possible to obtain homogeneous expanded particles.

According to the method of producing expanded particles according to one or more embodiments of the present invention, it is possible to evaluate the homogeneity in quality of the resulting expanded particles on the basis of the weight dispersion ($S^2$) of the expanded particles represented by the following equation (1). Assume that, when polyolefin resin particles are released into an atmosphere having a pressure lower than the internal pressure of the vessel 1 and thereby expanded particles are produced, the weight of expanded particles obtained within a specified period of time from the start of the release is $Wc_{(n)}$ (unit: kg, n is an integer).

$$S^2 = \frac{1}{n}\sum_{i=1}^{n} (Wc_{(i)} - Y)^2 \qquad (1)$$

In equation (1), Y is the mean of the values of $Wc_{(n)}$ which are 1 to n (i in the equation is 1 to n), and is represented by the following equation (2).

$$Y = \frac{1}{n}\sum_{i=1}^{n} (Wc_{(i)}) \qquad (2)$$

In the method of producing expanded particles according to one or more embodiments of the present invention, the foregoing weight dispersion ($S^2$) of the expanded particles is not particularly limited, but is preferably not more than 1, more preferably not more than 0.5, even more preferably not more than 0.3, particularly preferably not more than 0.1.

According to the method of producing expanded particles according to one or more embodiments of the present invention, since an expanded particle producing apparatus according to one or more embodiments of the present invention is used, it is possible to reduce the amount of a dispersing agent adhering to the resulting expanded particles.

The amount of the dispersing agent adhering to expanded particles according to one or more embodiments of the present invention is not particularly limited, but is preferably not more than 1200 ppm, more preferably not more than 1000 ppm, even more preferably not more than 900 ppm, particularly preferably not more than 800 ppm.

Polyolefin-based resin expanded particles obtained in one or more embodiments of the present invention preferably have two melting peaks at the low-temperature side and the high-temperature side on a DSC curve obtained by differential scanning calorimetry (DSC) in which the temperature of the expanded particles is raised from 40° C. to 220° C. at a heating rate of 10° C./min. Polyolefin-based resin expanded particles having two melting peaks tend to broaden the range of choices of conditions for molding, such as the range of choices of heating temperature, when the polyolefin-based resin expanded particles are subjected to in-mold foaming molding.

It is also preferable that the percentage of high-temperature-side melting heat quantity ($\{Q_H/(Q_H+Q_L)\} \times 100$) (hereinafter also referred to as "DSC ratio") of polyolefin-based resin expanded particles obtained in one or more embodiments of the present invention is not less than 10% and not more than 40%. The DSC ratio can be calculated from low-temperature-side melting heat quantity ($Q_L$) and high-temperature-side melting heat quantity ($Q_H$) corresponding to the foregoing two melting peaks on the DSC curve, respectively. As used herein, the term "low-temperature-side melting heat quantity ($Q_L$)" refers to the quantity of heat corresponding to the area enclosed by the low-temperatureside melting peak and a line that runs from the maximum point between the low-temperature-side melting peak and the high-temperature-side melting peak to the base line at about the temperature at which the melting starts. The high-temperature-side melting heat quantity ($Q_H$) refers to the quantity of heat corresponding to the area enclosed by the high-temperature-side melting peak and a line that runs from the foregoing maximum point and to the base line at about the temperature at which the melting ends.

If polyolefin-based resin expanded particles have a DSC ratio of less than 10%, the polyolefin-based resin expanded particles tend to have a low closed cell ratio and the resulting polyolefin-based resin in-mold foamed molded product tends to be less recoverable from strain. If polyolefin-based resin expanded particles have a DSC ratio of more than 40%, it may be impossible to obtain sufficient second-step expandability when the polyolefin-based resin expanded particles are subjected to in-mold foaming molding, and the resulting polyolefin-based resin in-mold foamed molded product may be inferior in fusion between polyolefin-based resin expanded particles.

<4. In-Mold Foaming Molding>

Polyolefin-based resin expanded particles can be subjected to in-mold foaming molding by any of the following known methods: (a) a method in which the expanded particles are used "as-is"; (b) a method in which an inorganic gas such as air is injected into the expanded particles to impart expandability in advance; and (c) a method in which the expanded particles, which are in a compressed state, are filled into a mold to be molded. Among these, method (d) is preferred.

Specifically, an in-mold foamed molded product can be obtained by the following molding method, for example.

(1) Polyolefin-based resin expanded particles are compressed by air within a pressure-resistant vessel (e.g., vessel 1) and thereby air is injected into the polyolefin-based resin expanded particles. In this way, expandability is imparted to the polyolefin-based resin expanded particles.

(2) The obtained expanded particles are filled into a molding space (cavity) which is defined by two molds and which is closable but not hermetically.

(3) The polyolefin-based resin expanded particles are molded by heating them using steam or the like as a heating medium at a steam pressure of about 0.2 to 0.4 MPa for about 3 to 30 seconds and allowed to fuse together.

(4) The molds are cooled with water.

(5) The molds are opened and an in-mold foamed molded product is removed from the molds.

In one or more embodiments of the present invention, the expansion ratio of the in-mold foamed molded product is not particularly limited, but is preferably 3 to 90 times, more preferably 4 to 60 times. A polyolefin-based resin in-mold foamed molded product obtained by molding polyolefin-based resin expanded particles produced using an expanded particle producing apparatus according to one or more embodiments of the present invention is suitable for use in applications such as heat insulators, shock-absorbing packing materials, car interior materials, and car bumper core materials.

One or more embodiments of the present invention may have any of the following configurations.

[1] An expanded particle producing apparatus configured to produce expanded particles by: dispersing polyolefin resin particles in a vessel with water and a dispersing agent; maintaining an internal temperature and an internal pressure of the vessel at a certain temperature and a certain pressure; and thereafter releasing the polyolefin resin particles to an atmosphere having a pressure lower than the internal pressure of the vessel, the expanded particle producing apparatus including a blade stirrer including a stirrer base and an impeller blade that is attached to the stirrer base, the blade stirrer being positioned such that a ratio L1/L2 of a distance L1 to a depth L2 is not less than 0.01 and not more than 0.2 and that a central axis of the blade stirrer coincides with a central axis of the vessel, the distance L1 being a distance from a bottom of the vessel to a center of the stirrer base in a direction of a depth of the vessel, the depth L2 being the depth of the vessel.

[2] The expanded particle producing apparatus according to [1], wherein the ratio L1/L2 is not more than 0.1.

[3] The expanded particle producing apparatus according to [1] or [2], wherein the impeller blade has an angle of inclination θ1 of not less than 20° and not more than 70°.

[4] The expanded particle producing apparatus according to any one of [1] to [3], wherein a ratio d/D2 of a length d of the impeller blade to an inner diameter D2 of the vessel at a position where the impeller blade is provided is not less than 0.255 and not more than 0.375.

[5] The expanded particle producing apparatus according to any one of [1] to [4], wherein a ratio b2/d of a width b2 of the impeller blade to a length d of the impeller blade is not less than 0.4 and not more than 1.0.

[6] The expanded particle producing apparatus according to any one of [1] to [5], wherein the blade stirrer includes a plurality of the impeller blades.

[7] The expanded particle producing apparatus according to any one of [1] to [6], wherein, in 60% or more of a bottommost line of the impeller blade, a shortest distance C from any point on the bottommost line of the impeller blade to an inner wall of the vessel is 5 mm to 100 mm.

[8] The expanded particle producing apparatus according to any one of [1] to [7], further including a baffle provided in the vessel.

[9] The expanded particle producing apparatus according to [8], wherein: the baffle includes an inclined portion inclined toward a center of the vessel; and the inclined portion has an angle of inclination θ2 of not less than 2° and not more than 60°.

[10] The expanded particle producing apparatus according to [9], wherein a ratio L3/L4 of a length L3 of the inclined portion to a total length L4 of the baffle is not less than 0.2 and not more than 0.8, the length L3 being a length of the inclined portion in the direction of the depth of the vessel, the total length L4 being a total length of the baffle in the direction of the depth of the vessel.

[11] The expanded particle producing apparatus according to any one of [8] to [10], wherein: the baffle includes a narrow portion that is small in width and a wide portion that is large in width; and a ratio B1/B2 of a width B1 of the narrow portion to a width B2 of the wide portion is not less than 0.2 and not more than 0.8.

[12] The expanded particle producing apparatus according to any one of [8] to [11], wherein: the baffle includes a narrow portion that is small in width and a wide portion that is large in width; and a ratio L5/L4 of a length L5 of the narrow portion in the direction of the depth of the vessel to a total length L4 of the baffle in the direction of the depth of the vessel is not less than 0.2 and not more than 0.8.

[13] The expanded particle producing apparatus according to [11] or [12], wherein the narrow portion is positioned lower than the wide portion.

[14] The expanded particle producing apparatus according to any one of [1] to [13], wherein the vessel is a heat-and-pressure-resistant vessel.

[15] A method of producing expanded particles with use of the expanded particle producing apparatus recited in any one of [1] to [14].

[16] A method of producing expanded particles by: dispersing polyolefin resin particles in a vessel with water and a dispersing agent; maintaining an internal temperature and an internal pressure of the vessel at a certain temperature and a certain pressure; and thereafter releasing the polyolefin resin particles to an atmosphere having a pressure lower than the internal pressure of the vessel, the method including a step of stirring an aqueous dispersion slurry inside the vessel with use of a blade stirrer including a stirrer base and an impeller blade attached to the stirrer base, the blade stirrer being positioned such that a ratio L1/L2 of a distance L1 to a depth L2 is not less than 0.01 and not more than 0.2 and that a central axis of the blade stirrer coincides with a central axis of the vessel, the distance L1 being a distance from a bottom of the vessel to a center of the stirrer base in a direction of a depth of the vessel, the depth L2 being the depth of the vessel.

EXAMPLES

The following description will discuss one or more embodiments of the present invention in detail on the basis of Examples and Comparative Examples. Unless otherwise stated, "%" indicates a percentage by weight (wt %). Evaluation methods used in Examples and Comparative Examples are as follows. A polyolefin resin used here is a polypropylene resin.

<Degree of Vertical Mixing in Vessel: Ratio Between Weight Percentages of Polyolefin Resin Particles in Aqueous Dispersion Slurry at Surface and at Bottom>

An about 300 g portion of an aqueous dispersion slurry was taken from around the surface of the aqueous dispersion slurry contained in a vessel by scooping the portion with a cup of about 300 cc capacity. An about 300 g portion of the aqueous dispersion slurry was taken from around the bottom of the vessel by drawing the portion through a nozzle passing through the vessel from the inner wall to the outer wall of the vessel. The weight w1 (g) of each portion of the aqueous dispersion slurry was measured, and then polyolefin resin particles in the portion of the aqueous dispersion slurry were collected in a net bag. The polyolefin resin particles in the net bag were dried at 80° C. for 5 hours, and then the weight w2 (g) of the polyolefin resin particles was measured. The weight percentage of polyolefin resin particles was calculated using the following equation:

Weight percentage (%) of polyolefin resin particles in aqueous dispersion slurry=$(w2/w1) \times 100$.

In this specification, the weight percentage of polyolefin resin particles in a portion of an aqueous dispersion slurry at the surface of the aqueous dispersion slurry in a vessel is referred to as Wa (%), whereas the weight percentage of polyolefin resin particles in a portion of the aqueous dispersion slurry at the bottom of the vessel is referred to as Wb (%).

<Stagnation of Flow at Bottom of Vessel>

A visual check was carried out, and stagnation was evaluated based on the following criteria.

Not stagnated: There is almost no change in flow rate of polyolefin resin particles, and the polyolefin resin particles are uniformly mixed together Stagnated to a small extent: In some area at the bottom of the vessel, the flow rate of polyolefin resin particles is 80% or less of the flow rate of fluently flowing polyolefin resin particles in areas other than the bottom of the vessel Stagnated to a medium extent: In some area at the bottom of the vessel, the flow rate of polyolefin resin particles is 60% or less of the flow rate of fluently flowing polyolefin resin particles in areas other than the bottom of the vessel Stagnated to a great extent: In some area at the bottom of the vessel, the flow rate of polyolefin resin particles is 40% or less of the flow rate of fluently flowing polyolefin resin particles in areas other than the bottom of the vessel <Height L6 in Vertical Direction of Bubble Layer in Aqueous Dispersion Slurry in Vessel>

An aqueous dispersion slurry was stirred for 60 minutes, and then the stirring was stopped and the aqueous dispersion slurry was allowed to stand. Immediately after the aqueous dispersion slurry was allowed to stand, an increase in height L6 in the vertical direction of a bubble layer in the aqueous dispersion slurry in the vessel as compared to that before the stirring was measured.

<Weight of Expanded Particles Obtained within Specified Period of Time from Start of Release>

All expanded particles which had expanded within 1 minute from 1 minute after the start of release, within 1 minute from 3 minutes after the start of release, within 1 minute from 5 minutes after the start of release, within 1 minute from 7 minutes after the start of release, within 1 minute from 9 minutes after the start of release, within 1 minute from 11 minutes after the start of release, were collected in a net bag. The collected expanded particles were dried at 80° C. for 2 hours, and then the weight of the expanded particles was measured. The measured weight was used as weight $Wc_{(n)}$ (unit: Kg, n is an integer and represents the point in time at which the collection of particles was started) of expanded particles at each point in time.

<Expansion Ratio of Expanded Particles Obtained within Specified Period of Time from Start of Release>

All expanded particles which had expanded within 3 seconds from 2 minutes after the start of release, within 3 seconds from 5 minutes after the start of release, within 3 seconds from 8 minutes after the start of release, within 3 seconds from 11 minutes after the start of release, were collected in a net bag. An about 2 g portion of the collected expanded particles was dried at 60° C. for 2 hours, and then allowed to stand for 1 hour in a constant temperature and humidity chamber at a temperature of 23° C. and a humidity of 50%.

The weight w (g) of the expanded particles after allowed to stand was measured and thereafter the volume v (cm³) of the expanded particles was determined by a submersion method, and the absolute specific gravity ($\rho b = w/v$) of the expanded particles was obtained. Based on the ratio between the absolute specific gravity and the density ($\rho r$) of the unexpanded polypropylene resin particles, the expansion ratio ($K = \rho r / \rho b$) of expanded particles at each point in time was calculated.

<Amount of Dispersing Agent Adhering to Expanded Particles Obtained within Specified Period of Time from Start of Release>

The amount of a dispersing agent (tertiary calcium phosphate) adhering to expanded particles was determined in the following manner.

Specifically, all expanded particles which had expanded within 3 seconds from 2 minutes after the start of release, within 3 seconds from 5 minutes after the start of release, within 3 seconds from 8 minutes after the start of release, within 3 seconds from 11 minutes after the start of release, were collected in a net bag. W (g) of the collected expanded particles, 0.022% ammonium metavanadate, 0.54% ammonium molybdate, and 50.0 milliliters of an aqueous solution containing 3% nitric acid (this solution is a liquid for colorimetry) were placed in a conical beaker, stirred for 1 minute, and then were allowed to stand for 10 minutes.

The separated liquid phase was transferred into a quartz cell (optical path length: 1.0 cm), and absorbance A at a wavelength of 410 nm was measured with the use of a spectrophotometer (available from JASCO Corporation; V530).

The following equation was used to calculate the amount X (ppm) of the dispersing agent (tertiary calcium phosphate) adhering to the expanded particles from the absorption coefficient c (g/L·cm) of tertiary calcium phosphate measured in advance with the use of the liquid for colorimetry at a wavelength of 410 nm.

$$X \text{ (ppm)} = \frac{5.0 \times 10^4 \times \varepsilon \times A}{W}$$

Examples 1 to 4 and Comparative Examples 1 and 2

An aqueous dispersion slurry containing polyolefin resin particles, water, and a dispersing agent was stirred in a see-through vessel with the use of a blade stirrer according to one or more embodiments of the present invention or a conventional special H-type blade stirrer, and efficiency of vertical stirring was checked.

Example 1

An inclined paddle-type blade stirrer was placed inside a see-through, transparent acrylic vessel (capacity M=30 liters, cylindrical portion's inner diameter D1=290 mm, depth L2=540 mm) such that the distance L1 (i.e., the distance from the bottom of the vessel to the center in the direction of the depth of the vessel [i.e., vertical direction] of a stirrer base of the blade stirrer along the central axis of the vessel) was 32 mm. The blade stirrer was constituted by four impeller blades (two pairs, each of which is constituted by two impeller blades directly opposite each other with a stirrer shaft therebetween, are orthogonal to each other) in which the length d of each impeller blade is 87 mm, the angle of inclination θ1 each impeller blade to the stirrer shaft of is 45°, and the width b2 of each impeller blade inclined is 52 mm. The vessel was further provided with a baffle (total length L4=470 mm, width=12 mm, thickness=2 mm) inside thereof along the inner wall such that the baffle was directly opposing the axis of the blade stirrer.

In the vessel, 100 parts by weight of polyolefin resin particles (1.3 mg per particle), 200 parts by weight of pure water, 0.4 parts by weight of tertiary calcium phosphate (dispersing agent), and 0.01 parts by weight of a sodium alkylsulfonate (dispersion auxiliary agent) were placed, and stirred and mixed for 3 minutes by rotating the blade stirrer at 350 rpm. Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Example 2

The same operations as described in Example 1 were carried out with the use of the same apparatus as described in Example 1, except that (i) the impeller blades were changed to trapezoidal impeller blades each of which has an extended portion that matches the shape of the bottom of the vessel and in which the shortest distance C from a point on the bottommost line of the impeller blade to the inner wall of the vessel is 6 mm (length d of impeller blade is 87 mm, width b2 of impeller blade is 72 mm) and that (ii) the blade stirrer was relocated such that the distance L1 was 30 mm. In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Example 3

The same operations as described in Example 2 were carried out with the use of the same apparatus as described in Example 2, except that (i) the baffle was changed to a baffle having a length L3 of 240 mm (L3/L4=0.51) and including an inclined portion inclined at an angle of inclination θ2 of 10° and that (ii) the number of rotations of the blade stirrer was adjusted to 330 rpm so that no stagnation of flow would occur at the bottom of the vessel. In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Example 4

The same operations as described in Example 3 were carried out with the use of the same apparatus as described in Example 3, except that (i) the baffle was changed to a baffle in which the width B1 of a vertical portion (narrow portion) positioned lower than the inclined portion is 6 mm and the width B2 of a wide portion at the upper portion of the inclined portion (i.e., width of the inclined portion) is 12 mm (B1/B2=0.5) and that (ii) the number of rotations of the blade stirrer was adjusted to 300 rpm so that no stagnation of flow would occur at the bottom of the vessel. In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Example 5

The same operations as described in Example 4 were carried out with the use of the same apparatus as described in Example 4, except that the blade stirrer was relocated such that the distance L1 was changed from 30 mm to 80 mm. In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Examples 6 and 7

The same operations as described in Example 4 were carried out with the use of the same apparatus as described in Example 4, except that the angle of inclination θ1 of each impeller blade was changed from 45° to 20° (Example 6) or to 70° (Example 7). In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Example 8

The same operations as described in Example 4 were carried out with the use of the same apparatus as described in Example 4, except that the length d of each impeller blade was changed to 47 mm and the width b2 of each impeller blade was changed to 39 mm and thereby the impeller blades were reduced in size. In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Example 9

The same operations as described in Example 4 were carried out with the use of the same apparatus as described in Example 4, except that the width b2 of each impeller blade was changed to 30 mm. In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Comparative Example 1

The same operations as described in Example 1 were carried out with the use of the same apparatus as described in Example 1, except that (i) the blade stirrer was changed to a blade stirrer which is equal in shape to the special H-type blade stirrer disclosed in Japanese Patent Application Publication, Tokukaisho, No. 59-172532, which has an angle of inclination of 10°, and which is positioned such that the distance L1 is 250 mm, that (ii) the width of the baffle was 23 mm, and that (iii) the number of rotations of the blade stirrer was changed to 200 rpm to reduce bubble formation. In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

Comparative Example 2

The same operations as described in Example 2 were carried out with the use of the same apparatus as described in Example 2, except that the blade stirrer was relocated such that the distance L1 was 135 mm (L1/L2=0.25). In this way, stirring and mixing were carried out.

Then, the weight percentage of polyolefin resin particles at the surface of the stirred aqueous dispersion slurry, the weight percentage of polyolefin resin particles at the bottom, stagnation of flow at the bottom of the vessel, and the height in the vertical direction of a bubble layer in the aqueous dispersion slurry in the vessel were measured. The measured values and conditions under which those were measured are shown in Table 1.

TABLE 1

| Conditions etc. | | Examples | | | | | |
|---|---|---|---|---|---|---|---|
| | | 1 | 2 | 3 | 4 | 5 | 6 |
| Shape of blade stirrer | | Inclined paddle-type | Inclined paddle-type | Inclined paddle-type | Inclined paddle-type | Inclined paddle-type | Inclined paddle-type |
| Distance L1 to center in depth direction | [mm] | 32 | 30 | 30 | 30 | 80 | 38 |
| Depth L2 of vessel | [mm] | 540 | 540 | 540 | 540 | 540 | 540 |
| L1/L2 | | — | 0.06 | 0.06 | 0.06 | 0.15 | 0.07 |
| Cylindrical portion's inner diameter D1 of vessel | [mm] | 290 | 290 | 290 | 290 | 290 | 290 |

TABLE 1-continued

| | | | | | | | |
|---|---|---|---|---|---|---|---|
| Inner diameter D2 of vessel at position where impeller blade is provided | [mm] | 240 | 235 | 235 | 235 | 290 | 255 |
| D2/D1 | — | 0.83 | 0.81 | 0.81 | 0.81 | 1.00 | 0.88 |
| Length d of impeller blade | [mm] | 87 | 87 | 87 | 87 | 87 | 87 |
| d/D2 | — | 0.36 | 0.37 | 0.37 | 0.37 | 0.30 | 0.34 |
| Width b2 of impeller blade | [mm] | 52 | 72 | 72 | 72 | 72 | 72 |
| b2/d | — | 0.60 | 0.83 | 0.83 | 0.83 | 0.83 | 0.83 |
| Angle of inclination θ1 of impeller blade | [°] | 45 | 45 | 45 | 45 | 45 | 20 |
| Shortest distance C | [mm] | 0 to 14 | 6 to 9 | 6 to 9 | 6 to 9 | 56 to 59 | 6 to 9 |
| Percentage of portion of bottommost line of impeller blade in which shortest distance C is 5 mm to 100 mm | [%] | 40 | 100 | 100 | 100 | 100 | 100 |
| Total length L4 of baffle | [mm] | 470 | 470 | 470 | 470 | 470 | 470 |
| Length L3 of inclined portion | [mm] | 0 | 0 | 240 | 240 | 240 | 240 |
| L3/L4 | — | 0 | 0 | 0.51 | 0.51 | 0.51 | 0.51 |
| Angle of inclination θ2 of baffle | [°] | 0 | 0 | 10 | 10 | 10 | 10 |
| Length L5 of narrow portion of baffle | [mm] | 0 | 0 | 0 | 230 | 230 | 230 |
| L5/L4 | — | 0 | 0 | 0 | 0.49 | 0.49 | 0.49 |
| Width B1 of narrow portion of baffle | [mm] | 12 | 12 | 12 | 6 | 6 | 6 |
| Width B2 of wide portion of baffle | [mm] | 12 | 12 | 12 | 12 | 12 | 12 |
| B1/B2 | — | 1 | 1 | 1 | 0.5 | 0.5 | 0.5 |
| Number of rotations for stirring | [rpm] | 350 | 350 | 330 | 300 | 300 | 300 |
| Weight percentage Wa at surface of slurry | [wt %] | 35 | 34 | 33 | 33 | 34 | 35 |
| Weight percentage Wb at bottom | [wt %] | 30 | 30 | 32 | 32 | 31 | 30 |
| Wb/Wa | — | 0.86 | 0.88 | 0.97 | 0.97 | 0.91 | 0.86 |
| Stagnation of flow at bottom of vessel | — | Stagnated to a small extent | Not stagnated | Not stagnated | Not stagnated | Stagnated to a small extent | Stagnated to a medium extent |
| Height L6 of bubble layer | [mm] | 52 | 51 | 46 | 40 | 43 | 38 |
| L6/L2 | — | 0.096 | 0.094 | 0.085 | 0.074 | 0.080 | 0.070 |

| | | Examples | | | Comparative Examples | |
|---|---|---|---|---|---|---|
| Conditions etc. | | 7 | 8 | 9 | 1 | 2 |
| Shape of blade stirrer | | Inclined paddle-type | Inclined paddle-type | Inclined paddle-type | Special H-type | Inclined paddle-type |
| Distance L1 to center in depth direction | [mm] | 17 | 19 | 19 | 250 | 135 |
| Depth L2 of vessel | [mm] | 540 | 540 | 540 | 540 | 540 |
| L1/L2 | — | 0.03 | 0.04 | 0.04 | 0.46 | 0.25 |
| Cylindrical portion's inner diameter D1 of vessel | [mm] | 290 | 290 | 290 | 290 | 290 |
| Inner diameter D2 of vessel at position where impeller blade is provided | [mm] | 187 | 196 | 196 | — | 290 |
| D2/D1 | — | 0.64 | 0.67 | 0.67 | — | 1.00 |
| Length d of impeller blade | [mm] | 87 | 47 | 87 | 87 | 87 |
| d/D2 | — | 0.47 | 0.24 | 0.44 | — | 0.3 |
| Width b2 of impeller blade | [mm] | 72 | 39 | 30 | — | 72 |

TABLE 1-continued

| | | Example 1 | Example 2 | Example 3 | Comparative Example 1 | Comparative Example 2 |
|---|---|---|---|---|---|---|
| b2/d | — | 0.83 | 0.83 | 0.34 | — | 0.83 |
| Angle of inclination θ1 of impeller blade | [°] | 70 | 45 | 45 | 10 | 45 |
| Shortest distance C | [mm] | 6 to 9 | 7 to 10 | 10 to 13 | — | 111 to 114 |
| Percentage of portion of bottommost line of impeller blade in which shortest distance C is 5 mm to 100 mm | [%] | 100 | 100 | 100 | — | 0 |
| Total length L4 of baffle | [mm] | 470 | 470 | 470 | 470 | 470 |
| Length L3 of inclined portion | [mm] | 240 | 240 | 240 | 0 | 0 |
| L3/L4 | — | 0.51 | 0.51 | 0.51 | 0 | 0 |
| Angle of inclination θ2 of baffle | [°] | 10 | 10 | 10 | 0 | 0 |
| Length L5 of narrow portion of baffle | [mm] | 230 | 230 | 230 | 0 | 0 |
| L5/L4 | — | 0.49 | 0.49 | 0.49 | 0 | 0 |
| Width B1 of narrow portion of baffle | [mm] | 6 | 6 | 6 | 23 | 12 |
| Width B2 of wide portion of baffle | [mm] | 12 | 12 | 12 | 23 | 12 |
| B1/B2 | — | 0.5 | 0.5 | 0.5 | 1 | 1 |
| Number of rotations for stirring | [rpm] | 300 | 300 | 300 | 200 | 350 |
| Weight percentage Wa at surface of slurry | [wt %] | 34 | 35 | 35 | 37 | 36 |
| Weight percentage Wb at bottom | [wt %] | 30 | 30 | 30 | 27 | 28 |
| Wb/Wa | — | 0.88 | 0.86 | 0.86 | 0.73 | 0.78 |
| Stagnation of flow at bottom of vessel | — | Stagnated to a medium extent | Stagnated to a medium extent | Stagnated to a medium extent | Stagnated to a great extent | Stagnated to a great extent |
| Height L6 of bubble layer | [mm] | 45 | 32 | 35 | 100 | 53 |
| L6/L2 | — | 0.083 | 0.059 | 0.065 | 0.185 | 0.098 |

It is clear from Table 1 that, in Example 1, the ratio (Wb/Wa) of the weight percentage of polyolefin resin particles at the surface of the aqueous dispersion slurry to the weight percentage of polyolefin resin particles at the bottom is 0.86, which is closer to 1 than that (0.73) of Comparative Example 1 and that (0.78) of Comparative Example 2. It was revealed that, because of this, the degree of vertical mixing was high, stagnation of flow at the bottom of the vessel was reduced, and the height (amount) of the bubble layer in the aqueous dispersion slurry was reduced.

It is also clear from Table 1 that, in Example 2 in which the blade stirrer with impeller blades each including an extended portion was used, the ratio (Wb/Wa) of the weight percentage of polyolefin resin particles at the surface of the aqueous dispersion slurry to the weight percentage of polyolefin resin particles at the bottom is 0.88, which is even closer to 1 than that of Example 1. It was revealed that, because of this, the degree of vertical mixing was higher than in Example 1 and no stagnation of flow occurred at the bottom of the vessel.

It is also clear from Table 1 that, in Example 3 in which the baffle including an inclined portion having an angle of inclination θ2 of 10° was used, the ratio (Wb/Wa) of the weight percentage of polyolefin resin particles at the surface of the aqueous dispersion slurry to the weight percentage of polyolefin resin particles at the bottom is 0.97, which is even closer to 1 than that of Example 2. It was revealed that, because of this, the degree of vertical mixing was higher than in Example 2, the height (amount) of the bubble layer in the aqueous dispersion slurry was less than Example 2, and the power required for stirring can be reduced by reducing number of rotations for stirring (rpm).

It was also revealed that, in Example 4 in which the baffle including a vertical portion (narrow portion) having a width B1 of 6 mm (B1/B2=0.5) was used, the power required for stirring can be reduced, by reducing the number of rotations for stirring (rpm), to a greater extent than Example 3.

In Example 5 which was based on the conditions of Example 4 and in which the blade stirrer was relocated such that the ratio L1/L2 was changed from 0.06 to 0.15, the ratio (Wb/Wa) of the weight percentage of polyolefin resin particles at the surface of the aqueous dispersion slurry to the weight percentage of polyolefin resin particles at the bottom was 0.91. The ratio (Wb/Wa) for weight percentage of polyolefin resin particles in Example 5 is a little smaller than that (0.97) of Example 4, but is closer to 1 than that (0.78) of Comparative Example 2 in which the ratio L1/L2 is greater than 0.2. This revealed that the degree of vertical mixing in Example 5 is higher than in Comparative Example 2.

In Examples 6 and 7 which were based on the conditions of Example 4 and in which the angle of inclination θ1 of each impeller blade was changed to 20° and 70°, respectively, the ratio (Wb/Wa) of the weight percentage of polyolefin resin particles at the surface of the aqueous dispersion slurry to the weight percentage of polyolefin resin particles at the bottom was 0.86 (Example 6) or 0.88 (Example 7). The ratio (Wb/Wa) for weight percentage of polyolefin resin particles in each of Examples 6 and 7 is a little smaller than that (0.97) of Example 4, but is closer to 1 than that (0.78)

of Comparative Example 2. This revealed that the degree of vertical mixing in Examples 6 and 7 is higher than in Comparative Example 2.

In Example 8 which was based on the conditions of Example 4 and in which the size of each impeller blade was changed such that the ratio d/D2 was 0.24 (length d=47 mm, width b2=39 mm), the ratio (Wb/Wa) of the weight percentage of polyolefin resin particles at the surface of the aqueous dispersion slurry to the weight percentage of polyolefin resin particles at the bottom was 0.86. The ratio (Wb/Wa) for weight percentage of polyolefin resin particles in Example 8 is a little smaller than that (0.97) of Example 4, but is closer to 1 than those of Comparative Examples 1 and 2. This revealed that the degree of vertical mixing in Example 8 is higher than in Comparative Examples 1 and 2.

In Example 9 which was based on the conditions of Example 4 and in which the width b2 of each impeller blade was changed to 30 mm such that the ratio b2/d was 0.35, the ratio (Wb/Wa) of the weight percentage of polyolefin resin particles at the surface of the aqueous dispersion slurry to the weight percentage of polyolefin resin particles at the bottom was 0.86. The ratio (Wb/Wa) for weight percentage of polyolefin resin particles in Example 9 is a little smaller than that (0.97) of Example 4, but is closer to 1 than those of Comparative Examples 1 and 2. This revealed that the degree of vertical mixing in Example 9 is higher than in Comparative Examples 1 and 2.

Examples 10 and 11 and Comparative Example 3

An aqueous dispersion slurry containing polyolefin resin particles, water, and a dispersing agent was stirred within a pressure-resistant vessel with the use of a blade stirrer according to one or more embodiments of the present invention or a conventional special H-type blade stirrer, and then was released into an atmosphere having a pressure lower than the internal pressure of the pressure-resistant vessel to obtain expanded particles. The obtained expanded particles were checked for their qualities and parameters in the production process.

Example 10

An inclined paddle-type blade stirrer was placed inside a pressure-resistant vessel (capacity M=300 liters, cylindrical portion's inner diameter D1=600 mm, depth L2=1300 mm) such that the distance L1 (i.e., the distance from the bottom of the vessel to the center in the direction of the depth of the vessel [i.e., vertical direction] of a stirrer base of the blade stirrer along the central axis of the pressure-resistant vessel) was 77 mm. The blade stirrer was constituted by four impeller blades (two pairs, each of which is constituted by two impeller blades opposite each other with a stirrer shaft therebetween, are orthogonal to each other) in which each impeller blade has a length d of 180 mm, each impeller blade has an angle of inclination θ1 to the stirrer shaft of 45°, each impeller blade has an extended portion whose maximum dimension in the vertical direction is 40 mm, and each impeller blade has a width b2 of 148 mm. The pressure-resistant vessel was further provided with a baffle (total length L4=1140 mm, width=24 mm, thickness=6 mm) inside thereof along the inner wall such that the baffle was directly opposing the axis of the blade stirrer.

In the pressure-resistant vessel, 100 parts by weight of polyolefin resin particles (1.3 mg per particle), 200 parts by weight of pure water, 0.8 parts by weight of tertiary calcium phosphate (dispersing agent), and 0.04 parts by weight of a sodium alkylsulfonate (dispersion auxiliary agent) were placed, and 10 parts by weight of carbon dioxide was further introduced. Then, the obtained aqueous dispersion slurry was stirred by rotating the blade stirrer at 220 rpm, while the temperature inside the pressure-resistant vessel was being raised to 148.4° C. and the pressure inside the pressure-resistant vessel was being raised to 2.94 MPa by carbon dioxide. Then, while the foregoing pressure inside the pressure-resistant vessel was maintained by use of carbon dioxide, the aqueous dispersion slurry was released through a 3.6 mm diameter opening (orifice) at the bottom of the pressure-resistant vessel into atmospheric pressure to obtain expanded particles.

While the aqueous dispersion slurry was being released into atmospheric pressure, the number of rotations of the blade stirrer was reduced from 220 rpm (at a point in time at which the release was started) to 195 rpm (3 minutes after the start of the release), to 170 rpm (6 minutes after the start of the release), and then to 145 rpm (9 minutes after the start of the release) in steps. Then, the weight of expanded particles obtained within a specified period of time from the start of the release, the expansion ratio of expanded particles obtained within a specified period of time from the start of the release, and the amount of the dispersing agent adhering to expanded particles obtained within a specified period of time from the start of the release were measured. The measured values and conditions under which those were measured are shown in Table 2.

Example 11

The same operations as described in Example 10 were carried out with the use of the same apparatus as described in Example 10, except that (i) the baffle was changed to a baffle in which the length L3 is 600 mm, the angle of inclination θ2 is 10°, the width B1 of a vertical portion (narrow portion) positioned lower than the inclined portion is 12 mm, and the width B2 of a wide portion at the upper portion of the inclined portion (i.e., width of the inclined portion) is 24 mm (B1/B2=0.5) and that (ii) while the aqueous dispersion slurry was being released into atmospheric pressure, the number of rotations of the blade stirrer was reduced from 200 rpm (at a point in time at which the release was started) to 175 rpm (3 minutes after the start of the release), to 150 rpm (6 minutes after the start of the release), and then to 125 rpm (9 minutes after the start of the release) in steps. In this way, expanded particles were obtained.

Then, the weight of expanded particles obtained within a specified period of time from the start of the release, the expansion ratio of expanded particles obtained within a specified period of time from the start of the release, and the amount of the dispersing agent adhering to expanded particles obtained within a specified period of time from the start of the release were measured. The measured values and conditions under which those were measured are shown in Table 2.

Comparative Example 3

The same operations as described in Example 10 were carried out with the use of the same apparatus as described in Example 10, except that (i) the blade stirrer was changed to a blade stirrer which is equal in shape to the special H-type blade stirrer disclosed in Japanese Patent Application Publication, Tokukaisho, No. 59-172532, which has an angle of inclination of 10°, and which is positioned such that the distance L1 is 620 mm, that (ii) the width of the baffle was 48 mm, and that (iii) the number of rotations of the blade stirrer during the release of the aqueous dispersion slurry into atmospheric pressure was maintained at 121 rpm. In this way, expanded particles were obtained.

Then, the weight of expanded particles obtained within a specified period of time from the start of the release, the expansion ratio of expanded particles obtained within a specified period of time from the start of the release, and the amount of the dispersing agent adhering to expanded particles obtained within a specified period of time from the start of the release were measured. The measured values and conditions under which those were measured are shown in Table 2.

TABLE 2

| Conditions etc. | | | Examples 10 | Examples 11 | Comparative Example 3 |
|---|---|---|---|---|---|
| Shape of blade stirrer | | | Inclined paddle-type | Inclined paddle-type | Special H-type |
| Distance L1 to center in depth direction | | [mm] | 77 | 77 | 620 |
| Depth L2 of pressure-resistant vessel | | [mm] | 1300 | 1300 | 1300 |
| L1/L2 | | — | 0.06 | 0.06 | 0.48 |
| Cylindrical portion's inner diameter D1 of pressure-resistant vessel | | [mm] | 600 | 600 | 600 |
| Inner diameter D2 of pressure-resistant vessel at position where impeller blade is provided | | [mm] | 524 | 524 | — |
| D2/D1 | | — | 0.87 | 0.87 | — |
| Length d of impeller blade | | [mm] | 180 | 180 | 180 |
| d/D2 | | — | 0.34 | 0.34 | — |
| Width b2 of impeller blade | | [mm] | 148 | 148 | — |
| b2/d | | — | 0.82 | 0.82 | — |
| Angle of inclination θ1 of impeller blade | | [°] | 45 | 45 | 10 |
| Shortest distance C | | [mm] | 12 to 15 | 12 to 15 | — |
| Percentage of portion of bottommost line of impeller blade in which shortest distance C is 5 mm to 100 mm | | [%] | 100 | 100 | — |
| Total length L4 of baffle | | [mm] | 1140 | 1140 | 1140 |
| Length L3 of inclined portion | | [mm] | 0 | 600 | 0 |
| L3/L4 | | — | 0 | 0.53 | 0 |
| Angle of inclination θ2 of baffle | | [°] | 0 | 10 | 0 |
| Length L5 of narrow portion of baffle | | [mm] | 0 | 540 | 0 |
| L5/L4 | | — | 0 | 0.47 | 0 |
| Width B1 of narrow portion of baffle | | [mm] | 24 | 12 | 48 |
| Width B2 of wide portion of baffle | | [mm] | 24 | 24 | 48 |
| B1/B2 | | — | 1 | 0.5 | 1 |
| Number of rotations for stirring | From start of release to 3 minutes after start of release | [rpm] | 220 | 200 | 121 |
| | From 3 minutes after start of release to 6 minutes after start of release | [rpm] | 195 | 175 | 121 |
| | From 6 minutes after start of release to 9 minutes after start of release | [rpm] | 170 | 150 | 121 |
| | From 9 minutes after start of release to 12 minutes after start of release | [rpm] | 145 | 125 | 121 |
| Total number R of rotations for stirring with blade stirrer in 12 minutes | | Number of times | 2190 | 1950 | 1452 |
| Total power P required for stirring with blade stirrer in 12 minutes | | [kJ] | 2088 | 1656 | 2232 |

TABLE 2-continued

|  |  |  | Examples | | Comparative Example |
|---|---|---|---|---|---|
| Conditions etc. | | | 10 | 11 | 3 |
| Unit energy for stirring | | — | 3.18 | 2.83 | 5.12 |
| Weight of expanded particles | From 1 minute after start of release to 2 minutes after start of release | [kg] | 5.86 | 6.58 | 7.76 |
| | From 3 minutes after start of release to 4 minutes after start of release | [kg] | 6.12 | 6.25 | 8.00 |
| | From 5 minutes after start of release to 6 minutes after start of release | [kg] | 6.59 | 5.98 | 7.21 |
| | From 7 minutes after start of release to 8 minutes after start of release | [kg] | 6.48 | 6.05 | 5.78 |
| | From 9 minutes after start of release to 10 minutes after start of release | [kg] | 6.68 | 6.23 | 2.98 |
| | From 11 minutes after start of release to 12 minutes after start of release | [kg] | 6.08 | 6.26 | 2.74 |
| | Weight dispersion of expanded particles ($S^2$) | — | 0.11 | 0.04 | 5.59 |
| Expansion ratio of expanded particles | 2 minutes after start of release | [times] | 10.4 | 10.6 | 10.1 |
| | 5 minutes after start of release | [times] | 11.2 | 10.9 | 11.9 |
| | 8 minutes after start of release | [times] | 11.8 | 11.5 | 12.2 |
| | 11 minutes after start of release | [times] | 11.1 | 11.4 | 13.5 |
| Amount of dispersing agent (tertiary calcium phosphate) adhering to expanded particles | 2 minutes after start of release | [ppm] | 743 | 725 | 640 |
| | 5 minutes after start of release | [ppm] | 582 | 635 | 777 |
| | 8 minutes after start of release | [ppm] | 555 | 595 | 839 |
| | 11 minutes after start of release | [ppm] | 631 | 750 | 1350 |
| Time for aqueous dispersion slurry to be entirely released | | [min.] | 12.8 | 12.5 | 14.0 |

It is clear from Table 2 that the weight of expanded particles obtained within a specified period of time from the start of the release is more stable in Example 10 than in Comparative Example 3, and is even more stable in Example 11. Table 2 also shows that the expansion ratio of expanded particles obtained within a specified period of time from the start of the release is more stable in Example 10 than in Comparative Example 3, and is even more stable in Example 11. Table 2 also shows that the amount of the dispersing agent (tertiary calcium phosphate) adhering to expanded particles obtained within a specified period of time from the start of the release is more stable in Example 10 than in Comparative Example 3, and is even more stable in Example 11. Table 2 further shows that the time for the aqueous dispersion slurry to be entirely released is shorter in Example 10 than in Comparative Example 3, and is even shorter in Example 11. Table 2 further shows that the total power required for stirring in 12 minutes while heating in the pressure-resistant vessel is smaller in Example 10 than in Comparative Example 3, and even smaller in Example 11. Table 2 shows that, on the other hand, the total number of rotations for stirring in 12 minutes is less in Comparative Example 3 than in Examples 10 and 11, and this revealed that the unit energy for stirring is smaller in Example 10 than in Comparative Example 3, and is even smaller in Example 11.

An expanded particle producing apparatus according to one or more embodiments of the present invention is capable of providing homogeneous expanded particles, and therefore is suitable for use in production of polyolefin-based resin expanded particles.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Vessel
2 Stirrer shaft
3 Impeller
4 Stirrer base
5 Stirrer blade
10 Baffle
11 Vertical portion
12 Inclined portion
D1 Cylindrical portion's inner diameter of vessel
D2 Inner diameter of vessel at position where impeller blade is provided
L1 Distance from bottom of vessel to center in direction of depth of vessel (vertical direction) of stirrer base of blade stirrer
L2 Depth of vessel
θ1 Angle of inclination
d Length of impeller blade
b1 height of impeller blade
b2 Width of impeller blade
C Shortest distance from somewhere on bottommost line of impeller blade to inner wall of vessel
L3 Length of inclined portion in direction of depth of vessel
L4 Length of baffle in vertical direction (total length)
L5 Length of narrow portion of baffle in vertical direction
θ2 Angle of inclination
B1 Width of narrow portion of baffle
B2 Width of wide portion of baffle

What is claimed is:

1. An expanded particle producing apparatus, comprising:
a vessel;
a blade stirrer that is located inside the vessel; and
a baffle that is provided in the vessel,
wherein:
the blade stirrer comprises a stirrer base and an impeller blade that is attached to the stirrer base,
a distance from the bottom of the vessel to the center of the stirrer base (L1) and a depth of the vessel (L2) have a ratio (L1/L2) of 0.01 to 0.2,
L1 is measured in a depth direction parallel to L2,
a central axis of the blade stirrer coincides with a central axis of the vessel,
the baffle includes an upper portion and a lower portion,
the upper portion includes an inclined portion that is inclined relative to the central axis of the vessel,
a length (L3) of the inclined portion and a total length (L4) of the baffle has a ratio (L3/L4) of 0.2 to 0.8, both of the lengths L3 and L4 are measured in the depth direction,
the lower portion includes a vertical portion that extends along the vertical direction in the vessel,
the baffle includes a narrow portion and a wide portion,
a width (B1) of the narrow portion and a width (B2) of the wide portion have a ratio (B1/B2) of 0.2 to 0.8,
a length (L5) of the narrow portion in the depth direction and a total length (L4) of the baffle in the depth direction have a ratio (L5/L4) of 0.2 to 0.8,
the narrow portion is positioned lower than the wide portion, and
the apparatus is configured to produce expanded particles by:
dispersing polyolefin resin particles in the vessel with water and a dispersing agent;
maintaining the vessel at a certain internal temperature and a certain internal pressure; and
thereafter releasing the polyolefin resin particles to an atmosphere having a pressure lower than the internal pressure of the vessel.

2. The apparatus according to claim 1, wherein the ratio L1/L2 is 0.01 to 0.1.

3. The apparatus according to claim 1, wherein the impeller blade is inclined relative to the depth direction, and has an angle of inclination (θ1) of 20° to 70°.

4. The apparatus according to claim 1, wherein a length (d) of the impeller blade and an inner diameter (D2) of the vessel have a ratio (d/D2) of 0.255 to 0.375, wherein D2 is an inner diameter of the vessel at the position where the impeller blade is provided.

5. The apparatus according to claim 1, wherein a width (b2) of the impeller blade and a length (d) of the impeller blade have a ratio (b2/d) of 0.4 to 1.0.

6. The apparatus according to claim 1, wherein the blade stirrer comprises a plurality of the impeller blades.

7. The apparatus according to claim 1, wherein, in 60% or more of a bottommost line of the impeller blade, a shortest distance C from any point on the bottommost line of the impeller blade to an inner wall of the vessel is 5 mm to 100 mm.

8. The apparatus according to claim 1,
wherein the inclined portion has an angle of inclination (θ2) of 2° to 60°.

9. The apparatus according to claim 1, wherein the vessel is heat resistant and pressure resistant.

* * * * *